United States Patent [19]
Long

[11] Patent Number: 5,905,564
[45] Date of Patent: May 18, 1999

[54] GYROSCOPIC, ARCUATE AND MULTI-POSITIONAL REFLECTOR AND CINEMATOGRAPH

[76] Inventor: Johnny D. Long, 3737 Raccoon Valley Rd., Powell, Tenn. 37849

[21] Appl. No.: 09/037,697

[22] Filed: Mar. 10, 1998

[51] Int. Cl.⁶ .................................................... G03B 25/00
[52] U.S. Cl. .............................. 352/98; 352/99; 352/101; 352/109
[58] Field of Search ................................ 352/98, 99, 101, 352/102, 105, 106, 107, 108, 109; 446/200, 217

[56] References Cited

U.S. PATENT DOCUMENTS

| | | | |
|---|---|---|---|
| 985,970 | 3/1911 | Bernett | 352/98 |
| 1,595,881 | 8/1926 | Schultz | 352/98 |
| 1,945,789 | 2/1934 | Revis | 352/98 |
| 2,154,031 | 4/1939 | Bunting | 352/98 |
| 3,740,128 | 6/1973 | Adler | 352/99 |

*Primary Examiner*—Russell Adams
*Attorney, Agent, or Firm*—M. Alex Brown, Patent Attorney

[57] ABSTRACT

A gyroscopic, arcuate and multi-positional reflector and Cinematograph, or cinematographic reflector, is disclosed which in hand-held embodiments reflects an image or motion-like illustration or image along an arcuate viewing field by virtue of a repeating sequence where an acute angle and dihedral relationship of opposing reflective and viewable image surfaces provides a perceptible image at diverse sight lines and tiltable positionings of the invention. And in mechanized, stationary, multi-panel embodiments, utilizes the same repeating sequence and critical reflective angle between image and reflective surfacing to provide an event viewing area along one or more perceptible sight lines of a viewer or user.

21 Claims, 15 Drawing Sheets

PRIOR ART

EVENT PROCESS

AS THE PLANES MOVE AXIALLY VIRTUAL IMAGES ON ONE PLANE BEGIN TO VANISH AS VIRTUAL IMAGES ON THE FOLLOWING PLANE BEGIN TO APPEAR THUS EXIBITING THE EFFECT OF MOTION PICTURES

SCHEMATIC LAYOUT OF PROCESS OF THE PRESENT INVENTION

5,905,564

GYROSCOPIC, ARCUATE AND MULTI-POSITIONAL REFLECTOR AND CINEMATOGRAPH

BACKGROUND OF THE INVENTION

Field of the Invention

The present invention relates to apparatus, methods and system for providing a reflective display based on a sequence of units having diametrically opposed reflective and image-bearing surfaces presented in a special adjacent respective positional relationship to each other, to produce the illusion of a motion picture.

BACKGROUND INFORMATION

Although no references were found specifically relating to the present invention, those references typical of other somewhat or marginally related prior art references related to reflecting, display or optical devices or systems, of those types found, are U.S. Pat. Nos. to Jamieson et al., 5,418,579; Baird, 4,952,004; Magers, 4,915,663; Moscovich, 4,898,560; Lasky, 4,500,088; Dewees et al., 4,307,528; Hampson, 4,214,808; Smith, 3,700,880; Elings et al, 3,647,284; Spear, 3,567,306; Orgo, 3,215,022; Wyser, 2,697,380; Weiner, 3,099,933; Quackenbush, 2,298,966; Bloxom, 2,381,801; Gentilini, 2,170,368; Carter, 813,860; Prestwich, 730,964; Keyes, 569,503; Casler, 549,309; Renard, 478,887; Hocker, 234,778; and Adams, 169,882.

Jamieson et al. '579 shows a multiplanar image display system having a plurality of display units disposed to expose, by transmission through and reflection by transparent panels, displayed images to a viewing end of an image chamber, producing overlapping images along a common viewing axis so as to create an illusion of a three-dimensional display. Jamieson discloses an apparatus which, though substantially different structurally and functionally, addresses providing a display of images in a number of overlapping planes to produce a three-dimensional effect with improved parallax effect, rather than providing a viewable motion-like image along various axes as the present invention does. The Jamieson patent, while marginally, or somewhat, related to the general field of art for this technology, is essentially a method for transmission of 3-D images by overlapping and superimposed images through a micro-computer; in distinction from the present invention, Jamieson is a closed system with an applied stationary unit process.

Magers '663 shows an image expanding apparatus, an optical toy image generator, disclosing a parabolic reflector having a central opening for receipt of an image bearing shaft. Through very different structure Magers addresses producing an enlarged proper image from a smaller central image, producing an image 360 degrees radially outwardly from a distorted image (to begin with). Motion-like image movement and hand-tiltable, multi-axis viewing of such a moving image are not disclosed. In distinction from the present invention, Magers essentially utilizes a single parabolic mirror to provide an amusing display. A true animated display is neither the object nor the functional result of Magers' teaching and application. For example, in accordance with Magers' teaching, if one were to push the rod used in Magers quickly through this invention's chamber, this would reasonably be expected to produce a complete blurring of any image or figure utilized.

Moscovich '560 shows a mirror pattern forming a puzzle-type amusement device which comprises a plurality of members which can be selectively assembled to produce different patterns or pictures. In Moscovich, the pattern sections assembled together to produce an overall pattern are reflected images of the patterns, by virtue of positioned stationary block-supported mirrors. No motion-like image is contemplated, or the object of Moscovich, and the structure and purpose are vastly different from the present invention. Moscovich essentially employs a single player who must manipulate the pieces of the invention's puzzle to assemble a single, non-moving (or non-motion) picture.

Lasky '088 shows a 3-D display device having a light box, a light source contained therein and a light diffusing translucent cover for the light box, each of which is supported in stationary position. A planar mirror is employed which contains on its surface a foreground image. The device utilizes the mirror to reflect a second background image thereon so as to superimpose the two images on each other, when viewed along a specific axis. Lasky essentially teaches another 3-D-type device for showing a single composite image, utilizing a semi-transparent mirror to superimpose a second image or figure. The Lasky device is stationary and does not create an illusion of movement, as is an important object of the present invention.

Dewees et al. '528 shows a rotating display of substantially different structure from the present invention, which employs a diffraction grating coaxially with a rotary reflector having a diverse plurality of small reflecting mirrors, each of which lies on a different plane from each of the reflecting mirrors located near by. The object of Dewees is to diffract reflecting light off its surfaces into all spectrum colors, the spectral light reflecting off the devices's diffraction grating impinging on its rotary reflector, and being transmitted to the viewer as a burst of colors, to give the elusion that its rotary reflector and the spectral light are rotating in opposite directions. No perceivable, motion-like image, illustration, or figure is contemplated by this device. Dewees basically teaches a rotating display which is in essence a stroboscopic device providing a prismatic effect. It does not create the elusion of animation. Further, the tiny mirrors used in Dewees are non-congruent, and different in positional relationship to those of the present invention; and, as such, are unable to perform any other function, or any function similar to the present invention.

Bloxom '801 shows a 'reflectoscope' the "primary object" of which is "to produce ludicrous effects within a wide range of variation through distortion by reflection." This device comprises a semi-circular mirror mounted pivotally in a tray-type enclosure, to be swung into and out of the tray, with a straight edge part of the mirror extending diametrically of the tray while being spaced slightly from the bottom of the tray. Bloxom's reflectoscope uses a single mirror that is manipulated to distort a single image.

Carter '860 shows a 'kinetoscope' for advertising which is principally designed to be mounted in a vehicle, such as a railway-car or a street railway car, and be powered by a wind-wheel that receives its driving force as a result of pressure of air thereagainst during travel of the vehicle. Carter essentially comprises the combination of a picture-disk in the form of the frustum of a cone and a perforated or apertured disk arranged concentric and parallel to the picture-disk; and bevel-geared apparatus for rotating each of the two disks in opposite directions in relation to each other. Additionally a view-casing enclosing each of the two disks is provided having upper sloping and straight bottom portions each adopted to carry advertising matter; and a limited lower sloping sight portion. No revolving and reflective means exist in this device and no expanded motion-like image is contemplated except that result which is obtained from this device as its picture disk, going in one direction, is viewed through its apertured disk going in another direction, at the same time, to create an imparted effect. Additionally, this device must be viewed from a certain sight axis while the device is secured in a stationary position.

Prestwich '964 shows an apparatus for exhibiting 'kinematographic' pictures having substantially different structural and functional elements broadly distinguishable from the present invention, as is the previously discussed prior art. The principal object of Prestwich is "to provide an optical means to render moving photographic pictures or prints apparently stationary without the defect of giving them an angular displacement and without causing the total optical distance between the picture and the eye of the observer to vary in length, so that the pictures will remain always in the same focus." Distinct differences in Prestwich include, but are not limited to: (1) its mirrors being mounted radially on the edge of a revolving wheel, extending the same diameter as its paper disks; (2) the reflecting surfaces of its mirrors being parallel with the axis about which its wheel revolves; (3) its wheel (o) and helical holder being mounted on the same spindle and being geared together by four (4) wheels so that its wheel (o) travels half the number of revolutions in the same direction as its helical (i.e., spirally twisted or skewed in configuration) holder, so that the difference in the angular movement between its pictures ($a^1$, $a^2$, and $a^3$) and mirror (m) will render each picture optically stationary to an observer; (4) its wheel (o), carrying its mirrors (m) so arranged to travel only half the rate of its disks, and, therefore, being provided with double the number of mirrors as there are pictures on each disk or blade of its helical holder; (5) in one of its preferred embodiments, two rows of pictures being printed on each of its disks of its helical holder to give stereoscopic effect; or pictures being printed on both sides of its disks, for reversing its holder to serve to provide two different scenes; (6) the device is designed so that the optical path of a light-ray from the eye to the device's mirror and from the mirror to the picture will always fall on the same point in the picture; and that the total length of the path of any ray of light will always be the same length, without tiltable positioning or further perceptible views of the same image being available; (7) if the picture utilized in the device moves in a circular or angular path the device's mirror moves through half the circular or angular path, so that pictures mounted spirally on a revolving drum are rendered stationary in appearance to an observer; and (8) claiming in its broadest claim "the combination of a helical picture-holder made from a series of flexible disks cut radially and having their cut edges joined respectively with the cut edges of similar disks on each side so as to form a deep-threaded screw with the pictures printed on the flat faces of the screw-blade near the circumference, a series of mirrors disposed at right-angles [as opposed to the present invention's acute angle] to the plane of the pictures upon the helical holder [not used in the invention] and means for moving the mirrors, at such a speed in regard to its helical holder that the pictures are rendered apparently stationary to the observer [rather than motion-like], substantially as set forth." Prestwich principally teaches a device which provides that pictures attain a function period of time, or moment, of rest by use of a shutter. It employs an eye shield, a helical (skewed-depth changing thread structure), and a mirror wheel separately geared to move at half the speed of the pictures (mounted on a separate structure) at right angles (90°) to the pictures. All of these varied and more complicated parts and functions are encased, or placed in a stationary closed system, within a 'kinematograph.'

Casler '309 shows a 'mutoscope,' or device for showing the changing positions of a body or bodies in action, with vastly different structure, and functional application of structure, from that of the present invention. This device presents images in a stationary, non-tiltable or non-positionable format. It essentially comprises a rectangular case, a transverse arbor or shaft carrying a spool which has its inner lateral flanges dovetailed to retain an elastically constructed card arranged in series to show successive positions. A worm-gear is secured on the outer end of the spool. On the arbor is a worm structure mounted longitudinally within a case and adopted to engage with the worm-gear for rotating it. The worm structure is provided with a crank-arm to rotate the spool upon which the pictures are mounted. A pin is mounted transversely in the case to engage with the upper forward end of the picture card to hold the cards back, so as to break their radial position and present the card's face to a vertical view and at the same time impart a springing movement to each of the cards as they are successively released. By successively and rapidly exposing the cards to view the appearance of a body in action is conveyed. Various other diverse and more complex structure is utilized in Casler to stagger and impart elasticity to its picture cards, and this reference specifically claims "a picture card" having its lower end convex for the purpose of causing the lower portion to assume a concavo-convex position in cross section when mounted. No tiltable or other multi-positional use while retaining a number of perceptible sight lines of the image is considered reasonably possible with this device, and no reflective means is utilized.

Additionally, at least one published reference shows a 'praxinoscope' device apparently developed by Emile Reynaud in France in the 1870's, utilizing and improving the principle of an invention know at that time as the 'zoetrope.' The 'zoetrope' functioned on the basis of the principle of persistence of vision, and was invented in Great Britain about 1834 by W. G. Horner. The 'zoetrope' consisted of a slot-pierced drum of metal revolving horizontally on a pivot attached to a heavy ground base structure. This device was provided with a set of paper bands equal in length to the circumference of its drum, and in width to half of its depth; and picturing in flat colors, and simple outlines, figures in various stages of movement. Horner also taught a flat disc placed on the bottom of its drum; around which, again, was placed the consecutive phases of movement of a figure. Functionally, when the figures on the band and the disc were viewed through one of a plurality of slots provided on the circumference of its drum, as the drum was rotated, the figures gave the elusion of movement. No reflective means was utilized in Horner's 'zoetrope.'

Reynaud's 'praxinoscope' device, said to have been patented in France in 1877 was similar in principle to Horner's 'zoetrope,' except that the drum slots were omitted; and, in lieu thereof, replaced by rectangular mirrors, set around an inner drum to reflect the circling figures, thus, apparently, exhibiting, or intended to exhibit, a smother and less dazzling movement of the figures than that of Horner's 'zoetrope.' An additional distinction from Horner was made by Reynaud's use of images reflected in the mirrors of the device's inner drum, while viewed through a 'proscenium' (or stage-like scene), between which and the turn table with the drums, were fixed pieces of scenery which remained stationary while the figures appeared to move. This device had to be utilized only in a certain restricted position in reference to the site line of an observer to be reasonably perceptible, and had variable numbers of figures or bodies in relation to the number of mirrors utilized, with substantially distinguishable positional relationships of images to mirrors and perceptible sight lines available (in vast distinction to the present invention), together with a substantially different structure, in relation to that of the present invention.

As indicated, Reynaud's 'praxinoscope' utilizes the principle of Horner's 'zoetrope,' and appears, though distinctly different from the invention, to be the closest art in reference to the present invention. To emphasize the differences with the present invention, a basic combination of the Horner and Reynaud teaching is presented with the present specification as FIGS. 5, 6, 7, and 8. As discussed, the 'praxinoscope' is similar to the 'zoetrope,' except that instead of viewing a band of images through slots, the observer has to look over the rim of Reynaud's drum to a central hub covered with mirrors, having different positional relationships, somewhat in random (and very different from the invention) in relation to its existing figures set forth around the inside of its drum. In that one must look over the rim and down inside the drum, one could, at that time, attribute the definitional suffix of the title term, "scope," as embodied in Reynaud. In function and structure Reynaud teaches that the position of the mirrors are such that as the device turns the images reflected turn away, possibly, at the central axis of each mirror so that one-half of the image is moving toward an observer while the other half of the image is moving away. Additionally, a black-out, or blank, section is provided to create a shutter effect that functions to separate the images and helps to eliminate, potentially, some of the blurring which was inherent in this device.

In substantial contrast, the present invention does not require any type of added shutter member. There is no drum, rim or other obstruction to prevent direct viewing. The present invention is an entirely open system in most preferred embodiments, and its functional process is performed without the use of "stop-motion" mechanisms, shutters, drums, or aperatures. Additionally, the distance and positional angles at which images and illustrations, and animated movement, can be viewed is only limited by normal viewing distances and inherent or natural environments presenting obstructions, if any, under which the present invention would be caused to function.

Therefore advantages over the prior art include, but are not limited to, the fact that the image event area of the present invention is constructed to continue axially forming a connected circular unit, so that the images reflected by the invention can be viewed from anywhere around the outside of the unit. At any event the moving images can be viewed entirely outside the construction of the present device as an open system, in that there is no need to look through slots or to look over the edge of a turning drum, or other obstruction, as in the prior art devices. And, as indicated above, there are no blacked-out sections in the process and sequence of reflected images presented by the invention, to cause blurring; in that there are no shutters, slots, aperatures, gears, "scopes" or other stop-motion structure utilized in the present invention.

None of the references found in the prior art specifically illustrate or disclose the cinematographic reflector of the present invention. Nor is the invention obvious in view of any of the prior art references listed. In addition all of the relevant prior art heretofore known suffer from a number of disadvantages.

None of the apparently crowded, prior art references teach concepts of invention which provide a relatively simple, and easy to manufacture, cinematographic reflector device, which can easily be pivoted and moved, and tiltably (or otherwise, multi-positionally) positioned, to provide a number of viewable and perceptible sight-lines to designs, illustrations and motion-like images.

In the past, the prior art shows that many problems in design and complexity of structural construction have been associated with attempting to provide a 'user-friendly,' stationary or multi-positionable, and easily manual device for providing illustrations and motion-like images through a cinematographic assembly in other than severly restricted and limited sight-lines.

Also, none of the prior art devices in this area of technology have utilized a stifly resilient, solidly constructed panel unit, supported at the periphery of a panel support base with an axial center portion, and having an image on one side and a diametrically or oppositely positioned reflective surface on the other side. Nor have past inventions in the art utilized the rotation of such a type of unit described, and the acute or dihedral angular positional relationship of the image on one side of one panel unit with the reflective surface on one side of another adjacent panel unit, to reflect successive images along an arcuate, gyroscopically, or otherwise accessable sight angle to observe perceptible designs or motion-like images, as a number of these panel units passed and reflected in relation to one another while in revolutionary or rotational movement.

Additionally, the prior art has not been shown to provide a cinematographic or motion-like image or elusion-image device having the same or similar structure, configurational shape or visual appearance, of the present invention; or to functionally provide a perceptible visual image which could easily be accessible from a plurality of positions on, and sight-lines relative to, the device itself.

Additionally, none of the prior art devices provide a cinematographic assembly having the previously discussed panel unit; nor do they provide such a device having such a panel unit whose number, relative angle with adjacent panel units, width distance, and/or radial and axial distances relative to an axial portion, are elucidated mathematically by the equation:

$$(r-t) = (x+t) - \left[\sin\left(\frac{180 - 720/n}{2} - \frac{360}{n}\right) \cdot (x+t)\right],$$

where: x equals the respective width distance of each of the panels, r equals the respective radial distance, n equals the number of panels utilized and connected to the peripheral suface of a base panel support member utilized at an acute angle positional relationship to an adjacent surface of another respective panel so connected, and t equals the respective radial distance minus the respective width distance of each respective panel; thereby defining the operational placement distance from the axial portion of the base panel support to the innermost part, or first end, of the width of the panel; and as otherwise explained in more detail in the balance of the specification.

These and other disadvantages, structurally and functionally, of the prior art will become apparent in reviewing the remainder of the present specification, claims and drawings.

Accordingly, it is an object of the present invention to provide a substantially improved cinematographic reflector device assembly having substantially enhanced and less complicated structure and versatility of use with regard to available, accessible sight-lines and perceptible motion-like images, designs and illustrations, which, in assembly, can be more easily, manually operated or driven by various power means to provide a smoother, more easily viewable image.

It is a further object of the present invention to provide an amusement and advertising device and assembly which can present cinematographic images at selected critical angles, among many available, to provide viewable images at various locations of the invention along various diverse sightlines.

It is yet a further object to specially position the novel panel unit of the invention having diametrically opposing reflective and image surfaces in reference adjacently to each other, and in reference to a axial portion; as mathematically elucidated by the special novel equations which apply to and characterize the invention. It is also another object in preferred embodiments of the invention to provide peripherally belt-supported, multi-panel units in relation to at least two panel support wheels to provide cinematographic images at selected locations.

It is a further object to provide a cinematographic reflector device which can be hand-held, manually powered, and easily tilted, angled, or otherwise positioned in reference to the eye, from a great number of sight lines, to perceive and view an image or motion-like presentation.

It will, therefore, be understood that substantial and distinguishable structural and functional advantages are realized in the present invention over the prior art devices; and that the present invention's simplicity of structure, diverse utility, and broad functional applications serve as important bases of novelty and distinction in this regard.

SUMMARY OF THE INVENTION

The foregoing and other objects of the invention can be achieved with the present invention, device and assembly which is a tiltable, angularly utilizable and multi-positional cinematographic reflector device; and a gyroscopic, arcuate and multi-positional reflector and Cinematograph. This invention is utilized for presenting images and motion-like illustrations in diverse perceptible viewing-event areas when the device is placed in a number of positions in relation to a sight-line of a user of the invention. The invention is provided with a panel support having a framework or base member and a plurality of panel member-units.

The framework or base member is provided with first and second surfaces; and defines and has a peripheral surface and at least one pivot channel between its first and second surfaces.

Each of the respective panel member-units is provided with at least a stiffly resilient first side and second side which is substantially, positionally opposite and congruent to one another, within reasonable adjustable limitations. The first side of each panel member-unit is provided with a reflective surface and the second side is provided with a viewable image.

The respective panel member-units are securely connected to, and supported by, the peripheral surface of the invention's framework or base member so as to be in adjacent respective positional relation to one another, with the second side of each of the respective panel member-units being at an acute angle (alpha) in reference to, and between, the first side of the adjacent respective panel member-unit; thereby defining a reflective and viewable image therebetween; i.e., between the respective adjacent second side of one panel member-unit and the respective opposing adjacent first side of another respective adjacent panel member-unit.

The invention is further provided with a pivot means for providing or imparting motion to the panel support, which is connected to at least one pivot channel of the framework member.

Upon motion of the frame work member, an image is defined and provided along a diverse number of viewing event areas which are perceivable and accessible along a number of sight lines by a viewer or user of the invention, and by virtue of a number of tiltable and positional placements and locations of the invention in reference to an observer.

Figure 1:
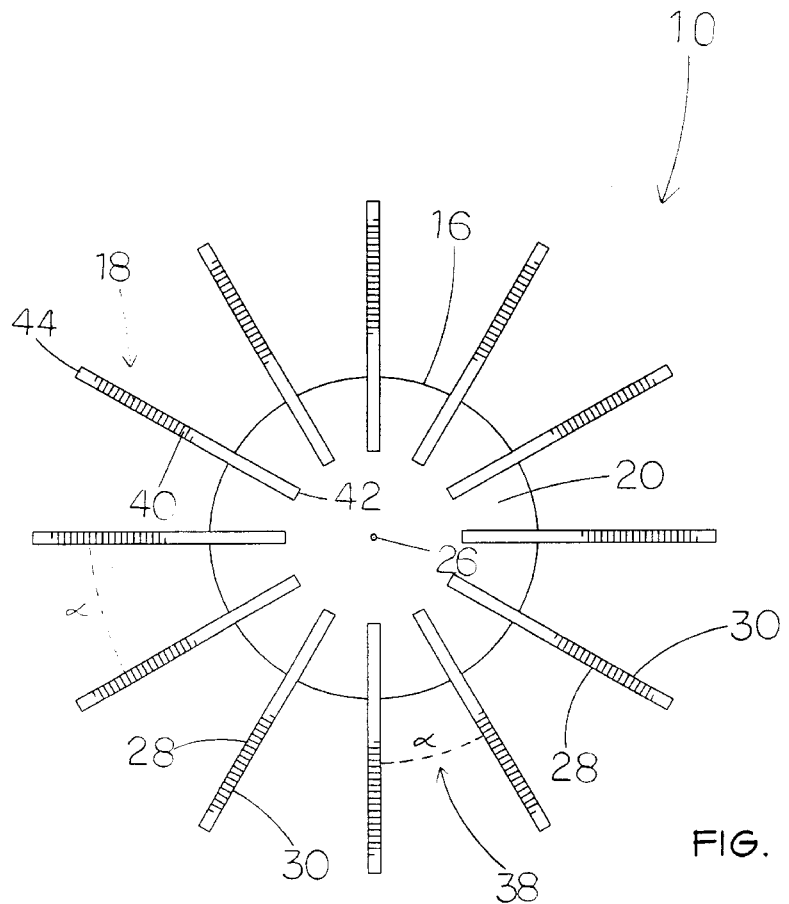
FIG. 1 is a top view of one preferred embodiment of the novel gyroscopic, arcuate and multi-positional reflector and Cinematograph of the present invention.
Figure 2:
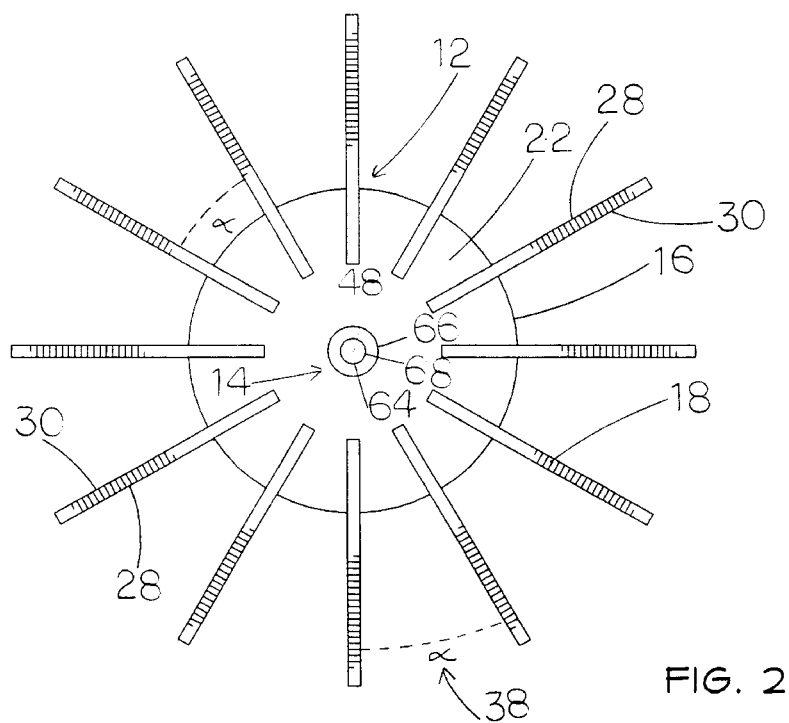
FIG. 2 is a bottom view of the reflector and Cinematograph of FIG. 1.

REFERENCE NUMBERS IN DRAWINGS 10 cinematographic reflector
12 panel support subassembly
14 pivot means subassembly
16 base member
18 panel members
20 first surface of (16)
22 second surface of (16)
24 peripheral surface of (16)
26 pivot channel of (16)
28 first side of (18)
30 second side of (18)
32 reflective surface of (28)
34 viewable image of (30)
36 acute angle (alpha)
38 reflective event unit (32) and (34)
40 width portion of (18)
42 first end of (40)
44 second end of (40)
46 width distance (42) and (44)
48 axial point of (26)
49 axial portion area
50 radial distance
52 first length portion (embodiment of FIGS. 9 and 18)
54 second length portion of (embodiment of FIGS. 9 and 18)
56 fourth side portion of (embodiment of FIGS. 9 and 18)
58 first auxiliary support member (different embodiment)
60 second auxiliary support member
62 axial rod member (embodiment of FIG. 20)
64 axial pivot submember of (FIGS. 2, 3, 4, and 9)
66 sleeve submember of (embodiment of FIGS. 2, 3, 4, and 9)
68 internal channel of (embodiment of FIGS. 2, 3, 4, and 9)
70 panel support subassembly of (FIGS. 10, 11, and 12)
72 first wheel members of (70) and (embodiment of FIGS. 10, 11, 12)
74 second wheel member of (70) and (embodiment of FIGS. 10, 11, and 12
76 first side of (72) and (74)
78 second side of (72) and (74)
80 circumferentially peripheral surface of (72) and (74)
82 pivot channel space of (72) and (74)
84 positional panel support belt of (70)
86 reflective event viewing area
88 power subassembly means

DETAILED DESCRIPTION OF THE PREFERRED EMBODIMENTS OF THE INVENTION

The following description of the preferred embodiments of the concepts and teaching of this present invention is made in reference to the accompanying drawing figures which constitute preselected illustrated examples of the structural and functional elements of the present invention, among many other examples existing within the scope and spirit of the present invention.

Referring now to the drawings, FIGS. 1, 2, 3, 4, 13, 14, 15, and 17, thereof, there is shown a gyroscopic, arcuate and multi-positional reflector and Cinematograph 10, of the present invention, referred to herein as the cinematographic reflector, or reflector, 10.

The reflector 10 is utilized for creating images and motion-like illustrations, and in one preferred embodiment is provided as an assembly having a panel support subassembly 12 and a pivot means subassembly 14.

The panel support subassembly is provided with at least one base member 16, and a number or plurality of panel members 18.

The base member 16 has at least a first surface 20 and a second surface 22, which is separated by and connected to a peripheral surface 24. The base 16 is also provided with at least one pivot channel 26, which preferably extends through the first surface 20, the peripheral surface 24, and the second surface 22, as illustrated by example in FIGS. 1 through 4; and is preferably placed in a central axial portion of the surfaces 20 and 22. Each of the panel members 18 has at least a first side 28 and a second side 30. The first side is provided with a reflective surface 32, such as a mirror; and the second side has a viewable image 34, which can be in the form of design, figure, illustration or image which is part of an overall sequence or series of images provided on the second side 30 of each of the respective panel members 18. The first and second sides 28 and 30 are preferably provided in opposite and parallel relation to one another and in a configurational shape which is generally congruent in relation to one another; although it will be understood that other such relationships can be utilized within the scope and spirit of the present invention.

The panel members 18 are each connected or attached, or provided integrally in combination with, the peripheral surface 24 of the base 16 so as to be positioned in adjacent or adjoining respective relation to one another; as shown generally by example in FIGS. 1, 2, 3, 4, 9, 10, 11, 12, 13, 14, 15 and 17. In so doing, the second side 30, containing the viewable image 34, of each of the respective panel members 18, is positioned in reference and relation to the first side 28, containing the reflective surface 32, of each of the, now adjacent, respective panel members 18; so that an acute angle (alpha) 36, is created or defined between the first and second surfaces thereof; that is, an angle of less than 90 degrees is formed between the viewable image of one panel member 18 and the reflective surface 32 of another panel member connected adjacent thereto.

Additionally, in some of the possible embodiments of the invention and reflector 10, shown by example herein, the number of first and second sides utilized is shown to be the same, so that the number of reflective surfaces 32 and viewable images 34 is the same as shown by example. However, the spirit and scope of the invention would also include preferred embodiments of the reflector 10 where different numerical relationships exist relative to the viewable images 34 and reflective surfaces 32; or where the number of reflective surfaces and viewable images is a divisible factor of each other. For example, by utilizing a diffraction grating or a polarizing grating construction, or other like or different image surfacing, having a plurality of images on the same second side 30; it would present a relationship where, in such types of use, there would be more viewable images 34 than reflective surfaces 32.

Additionally, it is preferred that each of the sides 28 and 30 be constructed from stiffly resilient material. However, a number of different materials, including partially elastic constructive material, can be utilized in the construction of the sides 28 and 30, and other elements, or member of the reflector 10.

The pivot means subassembly 14 can take the form in preferred embodiments of the invention of a manual, axial shaft, or shaft of other than linear configuration having an axial portion; or can be provided in a number of diverse forms including, but not limited to, electric or other power means, for imparting motion to the panel support subassembly 12.

The pivot 14 is connected, or otherwise attached, to at least one pivot channel 26 of the base 16 for providing or imparting motion or pivotable movement to this area. However, it will be understood, within the spirit of the present invention, that motion can be provided or imparted through other means and along different, or other, areas or portions of the panel support 12.

Upon motion of the base 16 and the connected panel members 18, an image is created or defined and provided along a various diverse number of viewing event areas, as shown generally by example in FIGS. 3, 4, 9, 12, 13, 14, and 15; which are perceptibly accessible and perceivable from a number or plurality of sight lines by an observer, viewer, or user utilizing the reflector 10.

In another preferred embodiment, the reflector 10 is tiltable, angularly moveable, and multi-positional in providing view to images and motion-like illustrations in perceptible viewing-event areas when placed in a number of positions in relation to a sight line of such user or observer of the reflector 10; as illustrated generally by example in FIGS. 3, 4, 9, 11, 12, 13, 14, and 15.

In this embodiment the base member 16 is provided in the form of a framework member, as shown by example in FIGS. 1 through 4. The panel members 18 take the form of respective panel member-units, each having at least the first side 28 and the second side 30, and their respectively borne reflective surface 32 and viewable image 34, positioned substantially opposite to one another. When mounted, and connected to and supported by the peripheral surface 24 in adjacent respective positional relationship to one another, the panel members 18, or panel member-units as they take the form of in this embodiment, are positioned so the second side 30 of each respective panel member 18 forms the acute angle (alpha) 36 with each first side 28 of each adjoining respective panel member 18. And by so doing, each opposing respective second side 30 and first side 28 are positioned preferably in dihedral positional relationship to one another; and are characterized herein as a reflective event unit 38 in that each such event unit 38 creates and defines in this embodiment a reflective and viewable image between its respectively opposing second side 30 and first side 28; and, accordingly, between each respective viewable image 34 and opposing reflective surface 32, respectively mounted on or as a part of, or otherwise provided by, the second side 30 of each respective panel member 18 and the opposing and adjacent first side 28 of each respectively adjoining other panel member 18; as positioned and installed on the peripheral surface 24.

Therefore, upon motion of the base 16, or framework member, as provided by the pivot means 14, as earlier discussed, an image is created and defined along each available reflective event unit 38, which provides the ability of the reflector 10 to create viewing-event areas, or reflected and viewable images, which are perceivable and accessible along a number of sight angles by a user, viewer or observer of the reflector 10; and, thereby, by virtue of a number of tiltable and positional placements and locations of the present invention in reference and relation to the sight-line of a user.

Additionally, in a preferred embodiment, each of the respective panel members has the width portion 40. This portion 40 has the first end 42 and the second end 44. the distance between the first and second ends 42 and 44 is the width distance 46. In this embodiment the pivot channel 26, in the form in this embodiment of a pivot space, defines an axial point 48. The distance between the axial point 48 and second end 44 of the width portion 40 is the radial distance 50.

In a preferred embodiment the positional relationship and number of each of the panel members 18 is mathematically elucidated and clarified by the equation and formula:

$$(r-t) = (x+t) - \left[\sin\left(\frac{180 - 720/n}{2} - \frac{360}{n}\right) \cdot (x+t)\right], \quad (1)$$

where, in this equation (1): x equals the width distance 46 of each respective panel member 18; r equals each respective radial distance 50; n equals the numerical amount of the panel members 18 connected to the peripheral surface 24 of the base 16, or frame work member; and t equals each respective radial distance 50 minus the respective width distance 46. In this mathematical relationship, the respective radial distance 50 minus the respective width distance width distance 46 provides and defines the respective operational placement distance from the axial point 48 to the first end 42 of each respective width portion 40 of each respective panel member 18.

Additionally, in this mathematical relationship and illustration of one teaching of the present invention; if n, or the number of panel members 18, is equal to or less than "8" (panel members utilized), the equation (1), just above, equals or yields a number which is equal to or less than ($\leq$) "0", or yields a negative (−) number. In such a case, operationally, the number of panel members 18 utilized will be at least "2" (i.e., n=at least 2), and the first end 42 of the respective width portion 40 will be placed positionally to adjoin, begin at, or be substantially or generally concurrent or proximate with the axial point 48. Additionally, in this case, the yield number of the equation (1) will be equal to or less than ($\leq$) the respective radial distance "r" (50).

In another preferred embodiment, the first and second ends 42 and 44, of the width portion 40, respectively take the form of the innermost edge and outermost edge, respectively, of the portion 40, between which the width distance 46 is defined. Also, the pivot channel 26, or pivot space, has and defines the axial portion area 49, as generally illustrated by example in FIG. 9. In this embodiment, the distance between the axial portion area 49 and the second end 44, in the form in this embodiment of the outermost edge, of the width portion 40, equals and defines the radial distance 50. In this embodiment, the positional relationship and number of respective panel members utilized in the invention is further elucidated, explained and clarified by the equation:

$$x = r - \left[\sin\left(\frac{180 - 720/n}{2} - \frac{360}{n}\right) \cdot r\right], \tag{2}$$

where, in equation (2), just above: x equals the width distance 46; r equals the radial distance 50; n equals the numerical amount, or number, of panel members 18 utilized in the reflector 10 and connected or attached to the peripheral surface 24 of the base 16, or frame work member; t equals the radial distance 50 minus the width distance 46; and where: x (width distance 46) also equals r (radial distance 50) minus (−) t; r (50) equals x (46) plus (+) t; and t equals r (50) minus x (46), and also equals in one embodiment:

$$\left[\sin\left(\frac{180 - 720/n}{2} - \frac{360}{n}\right) \cdot r\right].$$

Figure 16:
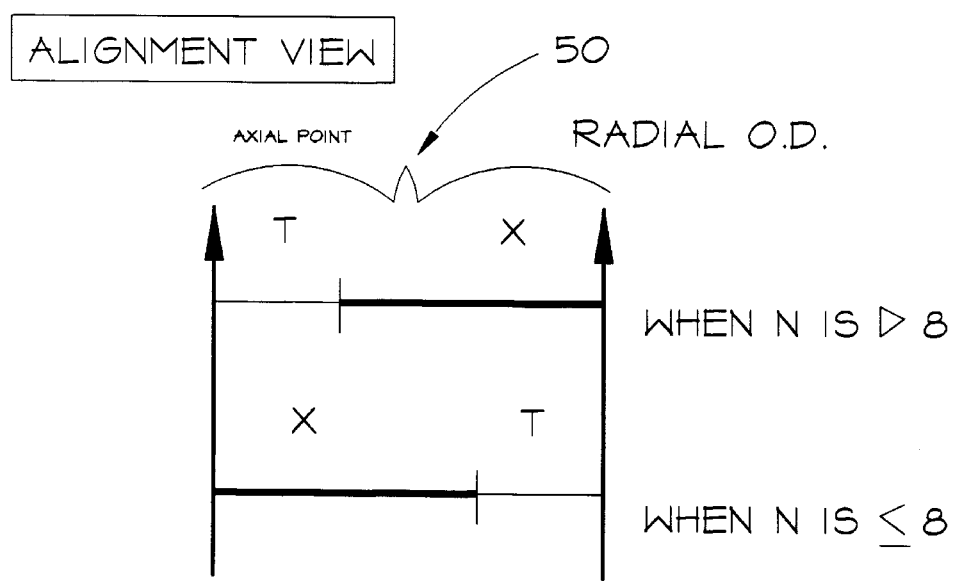
FIG. 16 is a general schematic illustration of structural and positional concepts related to the width distance, the radial distance, and the number of frame panel-units utilized in the present invention, as defined by equations (1) and (2) described in the present specification.
Figure 17:
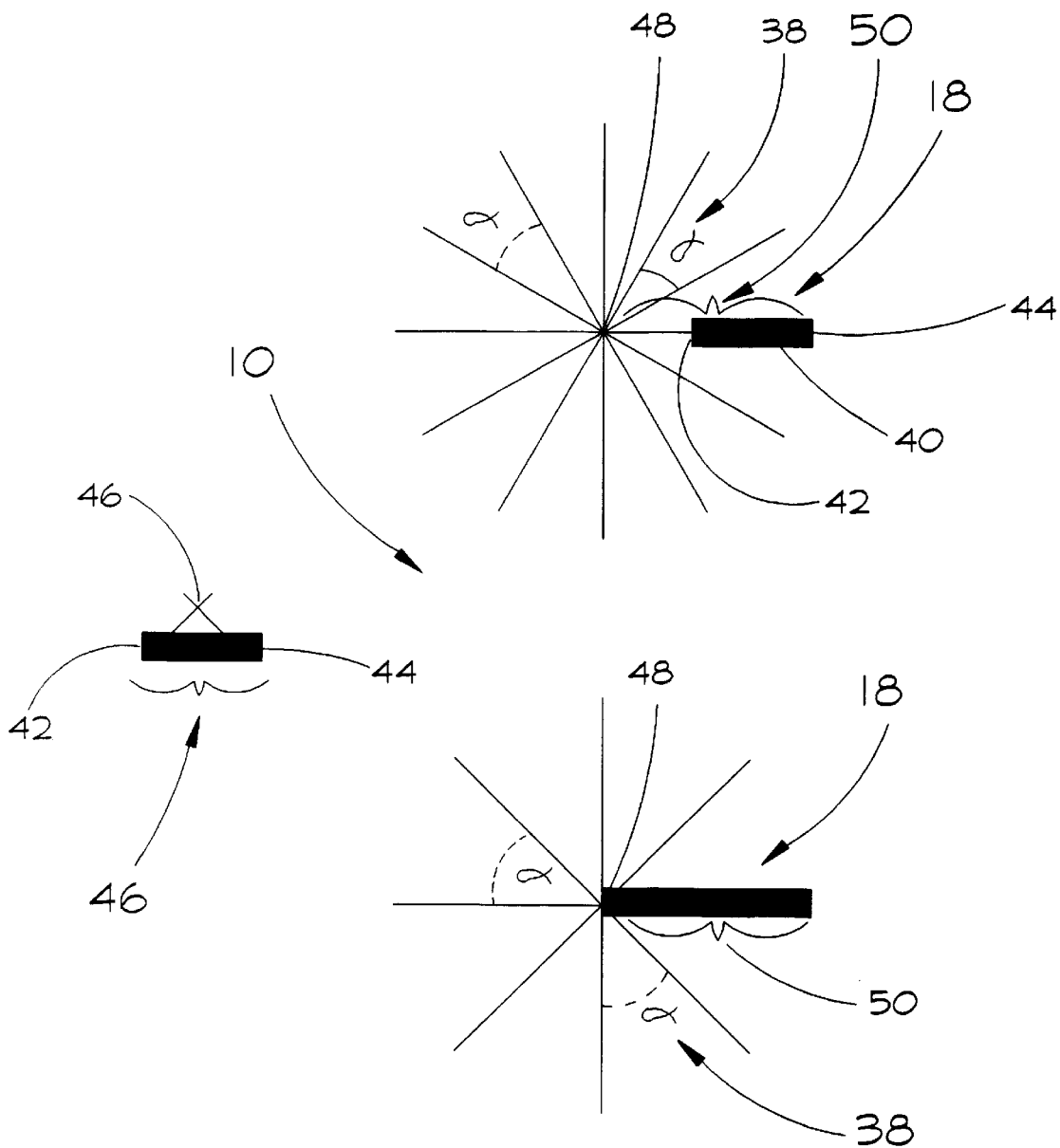
FIG. 17 is a further general schematic representation of concepts utilized in the present invention related to positional relationship of the panel members utilized and the width distance and radial distance relating to such panel members of the invention, and referenced in equations (1) and (2) of the specification.

Also, as similarly indicated with respect to equation (1); with regard to equation (2), in one preferred embodiment, the radial distance 50 minus (−) the width distance 46 substantially equals, defines and yields an operational placement distance for each of the panel members 18, from the axial portion area 49 to the first end 42, or innermost edge, of the width portion 40 of each panel 18. Some concepts of equations (1) and (2), with respect to values of x (46), t, and r (50, also identified in FIG. 16 as "Radial O.D.") are schematically set forth at FIGS. 16 and 17.

Additionally, as similarly indicated with respect to equation (1); in this embodiment and with regard to equation (2); if n is equal to between about 2 and 8, the equation equals, or "x" is equal to, a yield number which is equal to or less than 0, or a negative number (or integer). In this case, the first end 42, or innermost end, of the width portion 40 proximately, positionally adjoins, or substantially begins at the axial portion area 49. In this case, in one embodiment, the yield number of equation (2) is equal to or less than the radial distance 50.

Figure 3:
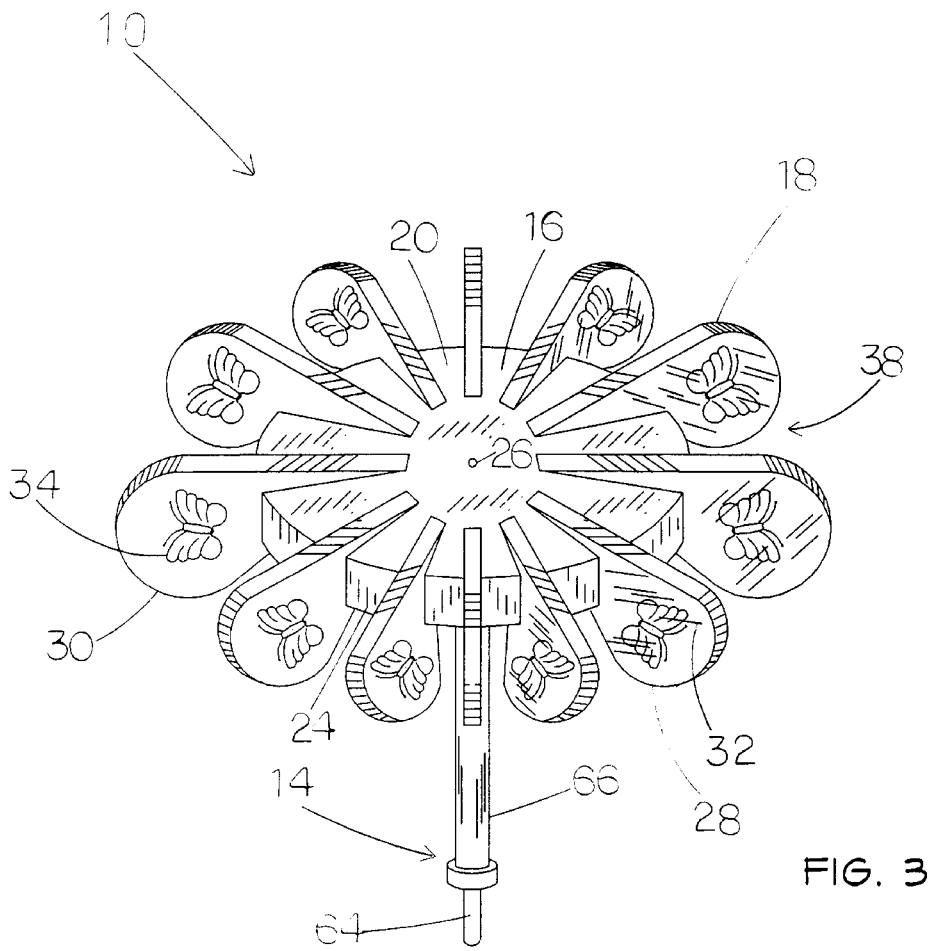
FIG. 3 is an elevated perspective view of the preferred embodiment of the reflector and Cinematograph of the present invention of FIG. 1.

In one preferred embodiment of the invention the base 16 is circular-like in configurational shape, as shown by example in FIGS. 1 through 4, when viewed from the top, bottom, or perspectively. In one embodiment the peripheral surface 24 is circumferentially oriented between the first and second surfaces 20 and 22, each of which is generally congruent to one another. The pivot channel 26 is in one embodiment, preferably positioned in general center axis (and defining a substantial radius to the peripheral edge), and in concentric relation to the first and second surfaces 20 and 22 of base 16, as shown in FIGS. 1 and 3.

Figure 4:
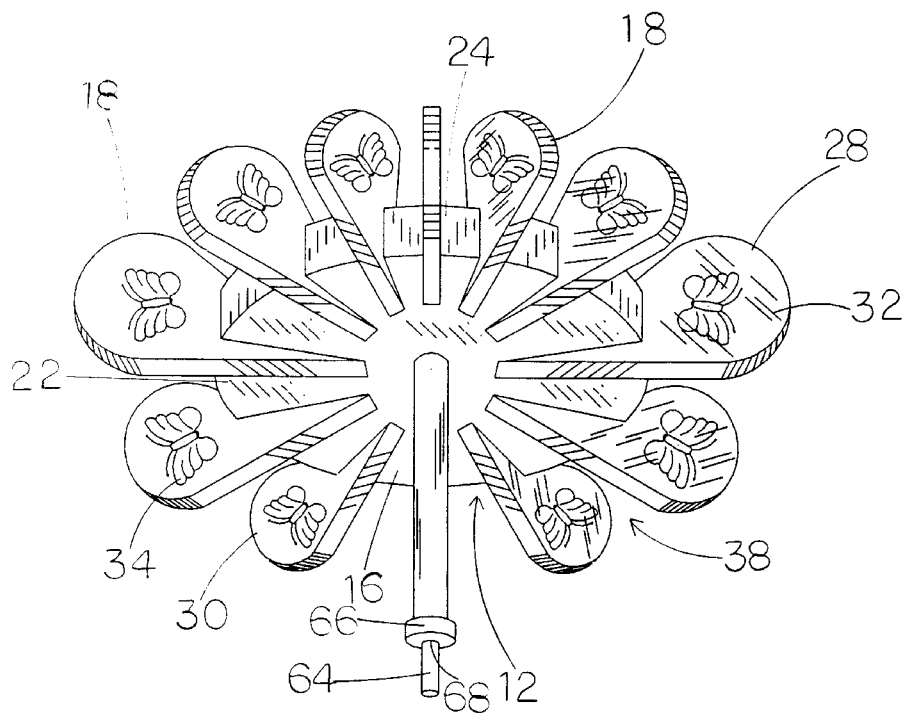
FIG. 4 is a lower perspective view of the reflector and Cinematograph of FIG. 1.
Figure 5:
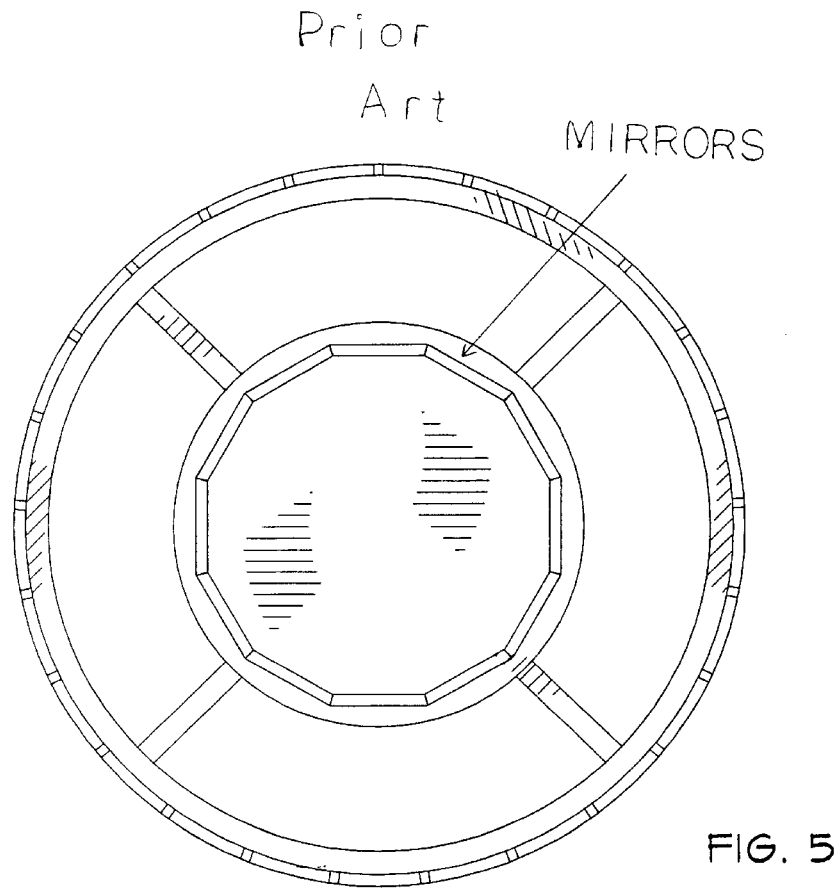
FIG. 5 is a top view of the combination of prior art teaching of Horner's 'zoetrope' and Reynaud's 'praxinoscope.'
Figure 6:
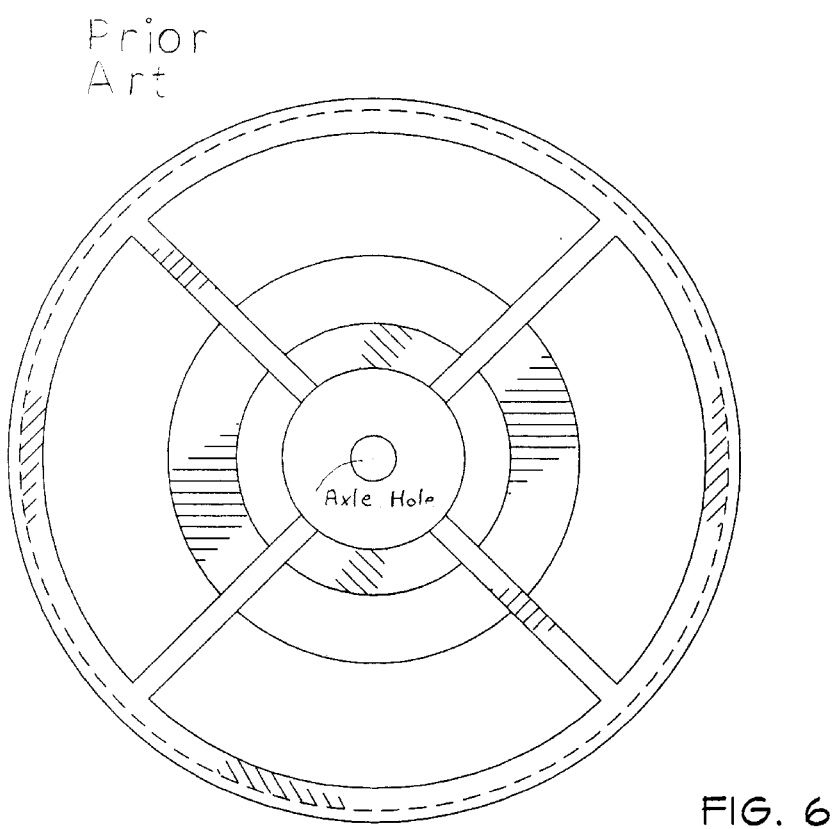
FIG. 6 is a bottom view of the prior art of FIG. 5.
Figure 7:
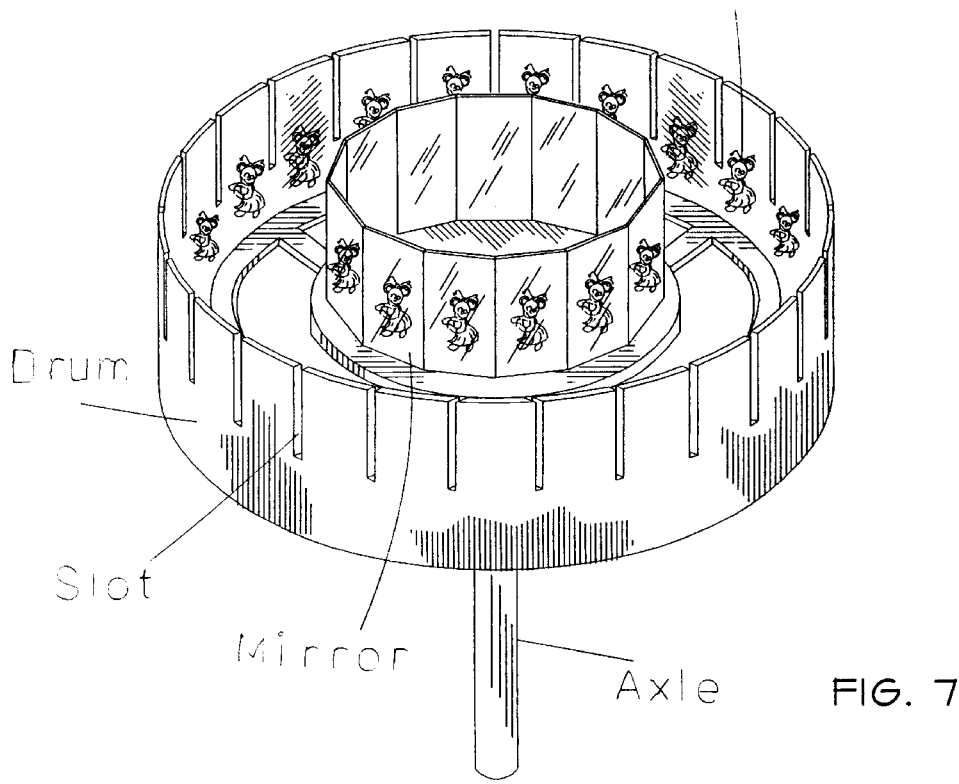
FIG. 7 is an elevated perspective view of the prior art of FIG. 5.
Figure 8:
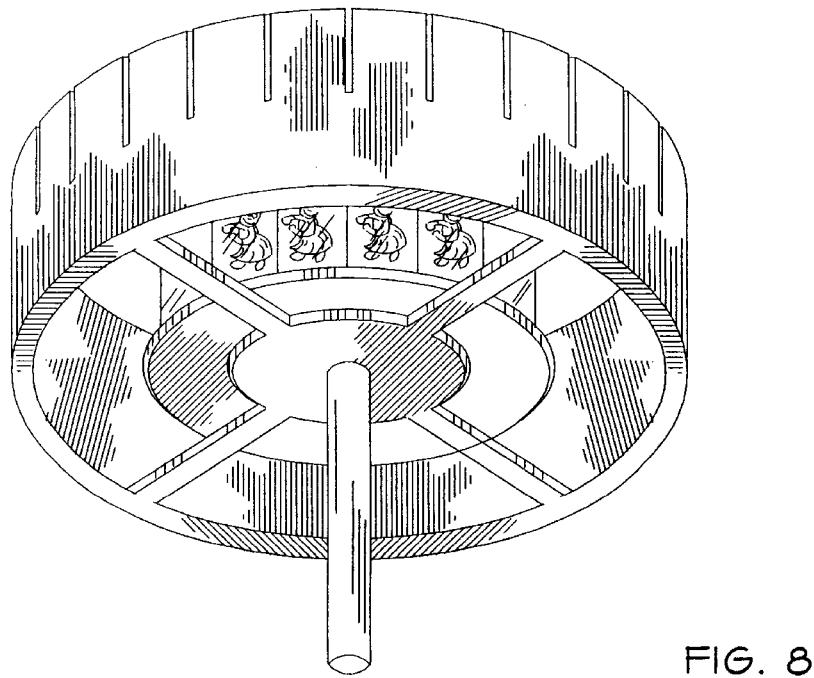
FIG. 8 is a lower perspective view of the prior art of FIG. 5.

Additionally, in one embodiment the panel members 18 are each circular or elliptical in configuration when viewed from the front or in perspective, as shown in FIGS. 3 and 4. Ina this embodiment, each panel 18 has a substantially diameter-like dimension as shown generally in FIGS. 1 and 2 which, in this case, constitutes the respective width portion 40.

Figure 9:
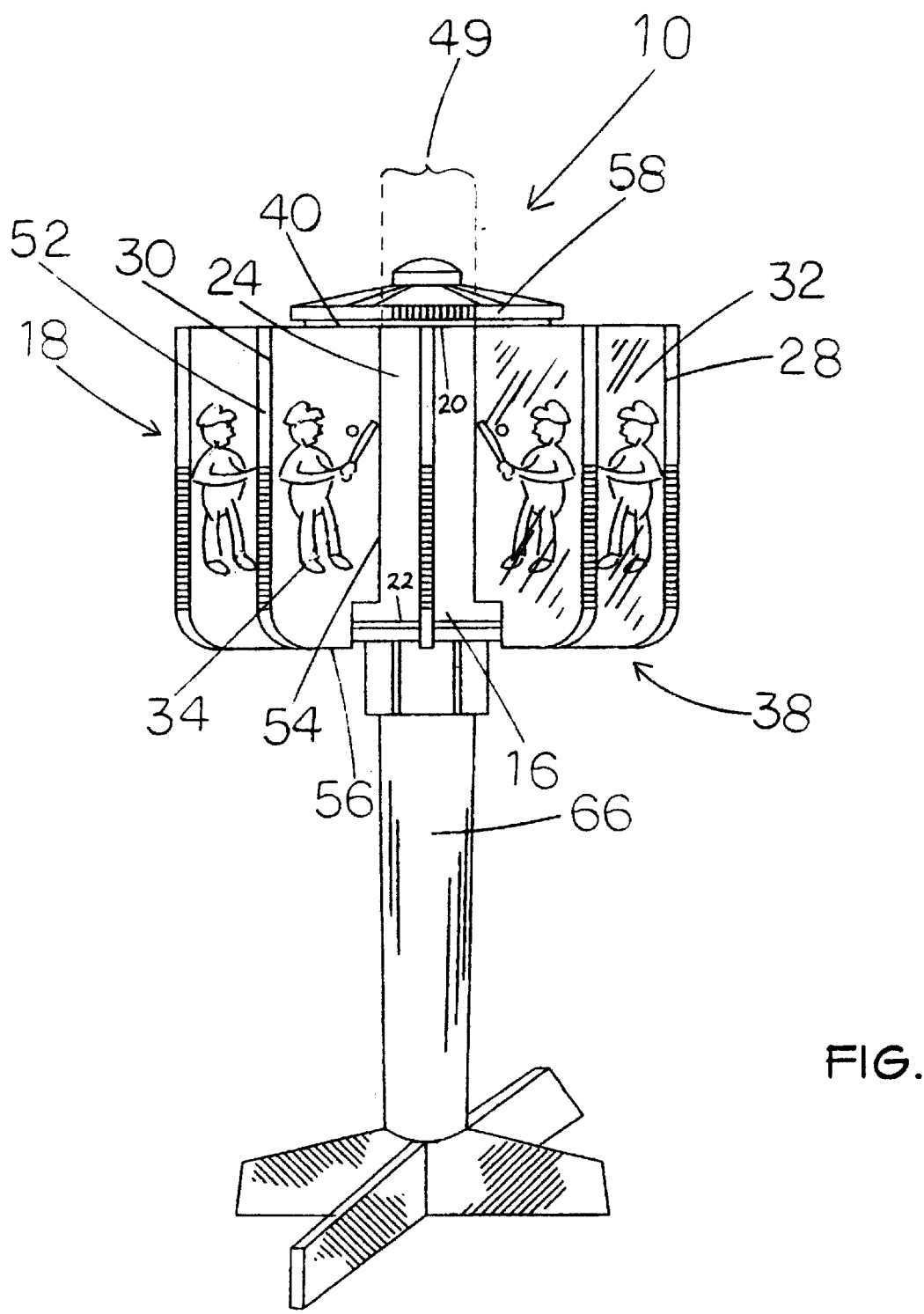
FIG. 9 is a perspective view of another preferred embodiment of the multipositional reflector and Cinematograph of the present invention.
Figure 10:
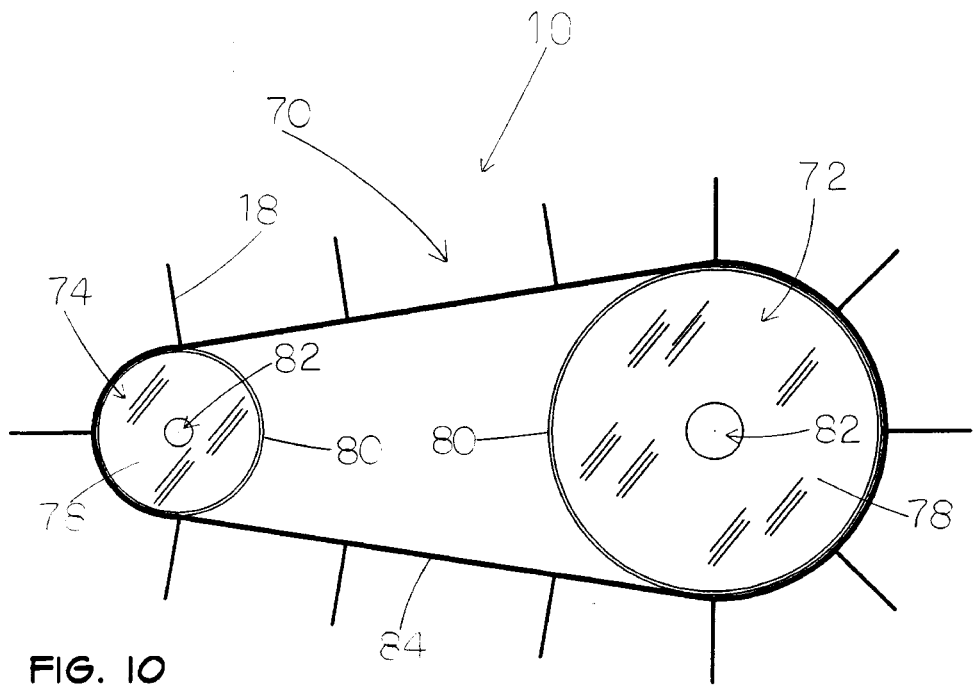
FIG. 10 is a bottom view of another preferred embodiment of the reflector and Cinematograph of the present invention.
Figure 11:
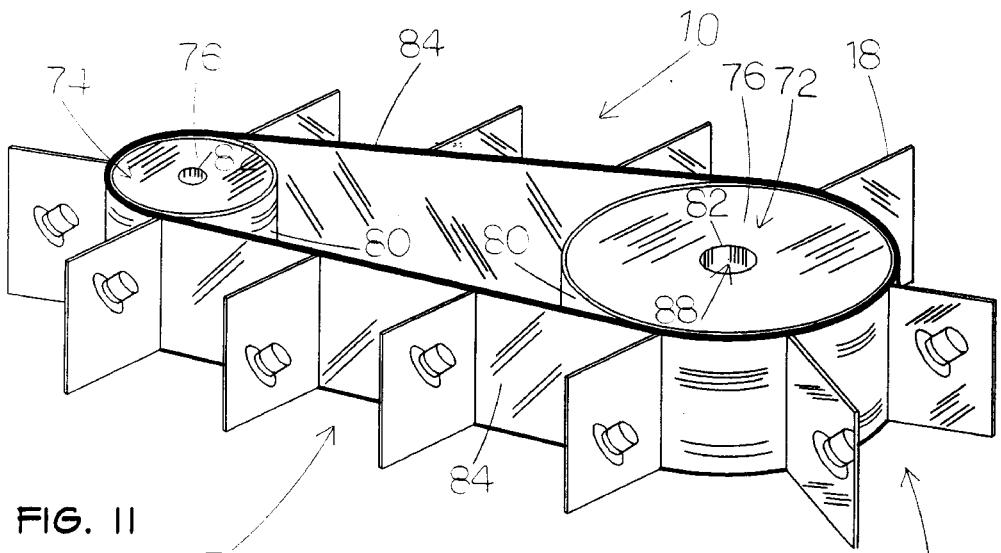
FIG. 11 is an elevated perspective view of the reflector and Cinematograph of FIG. 10.
Figure 18:
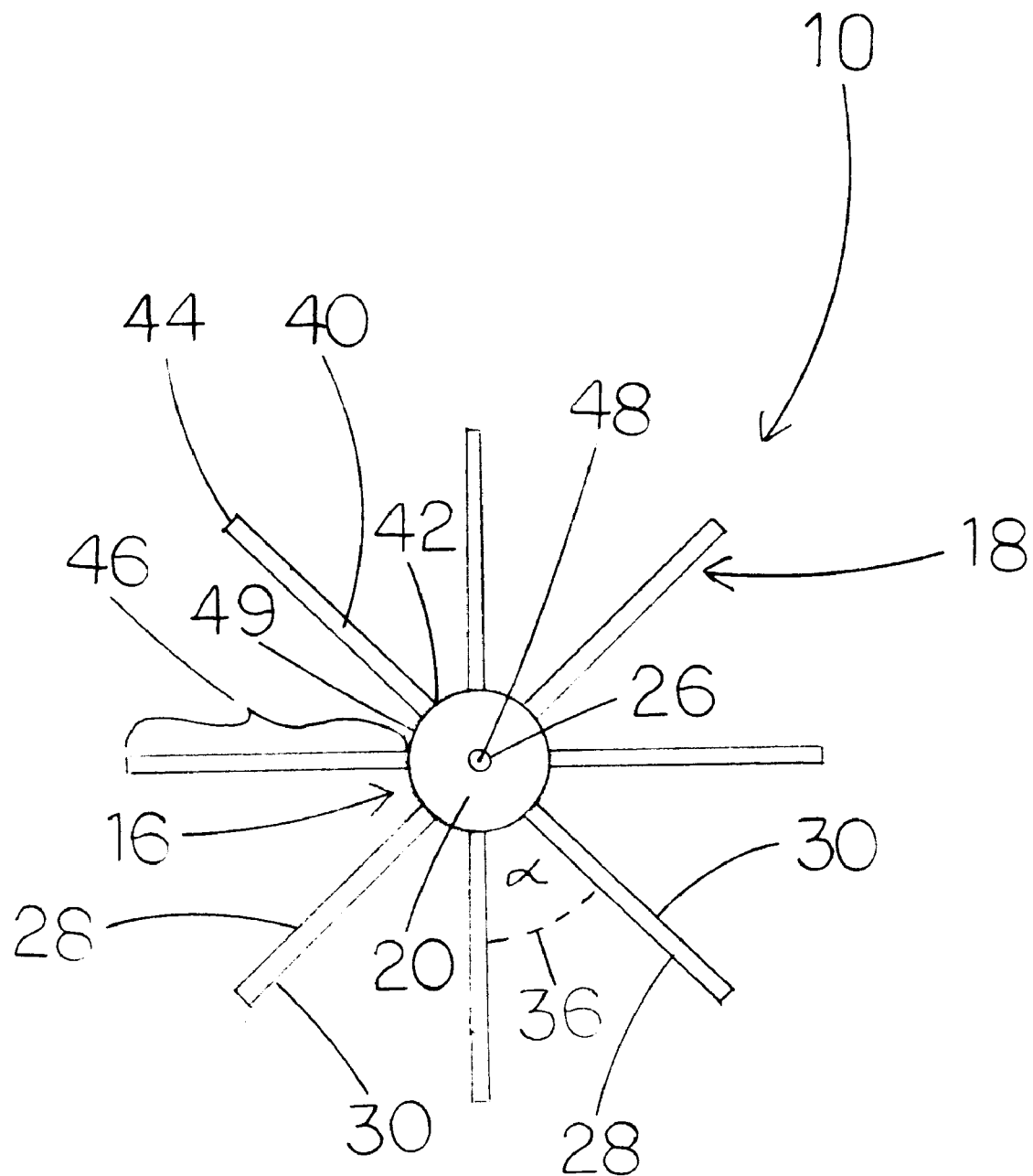
FIG. 18 is a top view of the embodiment of FIG. 9.

In another preferred embodiment the respective panel members 18 are generally square or rectangular-like in configuration and shape when viewed from the front or in perspective, as shown by example in FIGS. 9 and 18. In this embodiment, each of the panels 18 have first and second length portions 52 and 54, linearly oriented, and generally opposing and parallel to each other; the width portion 40, which, in this case is in the form of a third side portion, substantially transversely positioned between the first and second length portions 52 and 54; and a fourth side portion 56 which is generally cantilevered in configuration or shape, connecting between the first and second length portions 52 and 54, generally opposite of and positionally opposing the width portion 40, or third side portion.

In another preferred embodiment the base 16, or framework member, is further provided with at least the first auxiliary support member 58 for providing additional support to the respective panel members 18 in their interface and connection with the peripheral surface 24 of base member 16, as shown generally by example in FIGS. 9 and 18. The auxiliary support 58 is attached, connected, or integrally coupled to the first surface 20 of the base 16; and is further attached, or fitted to provide support, to each of the panel members 18, along adjoining or adjacent portions of the width portion 40.

Figure 19:
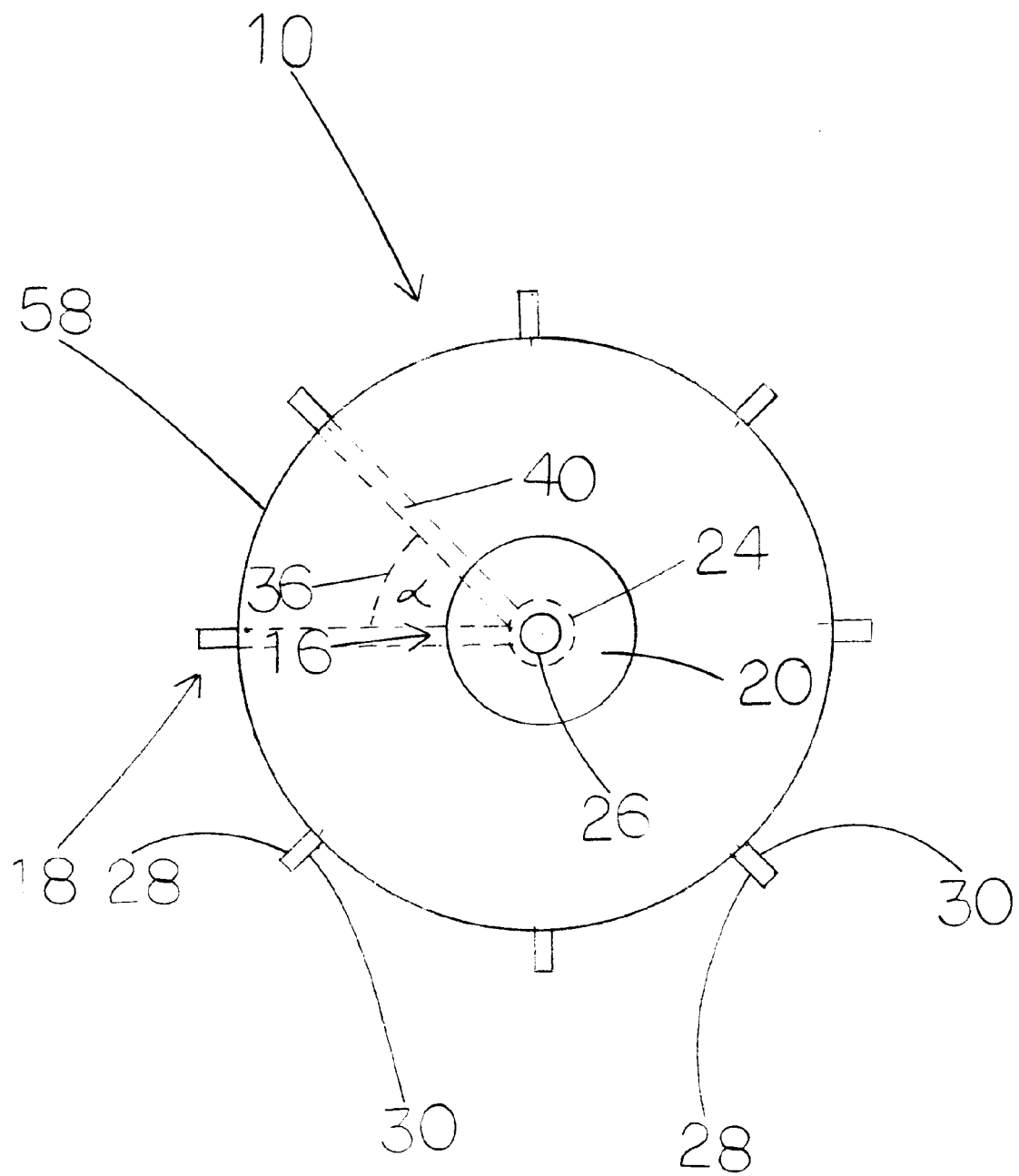
FIG. 19 is a top view of another preferred embodiment of the present invention, having eight (8) panel members and two auxiliary support members, described in the present specification.
Figure 20:
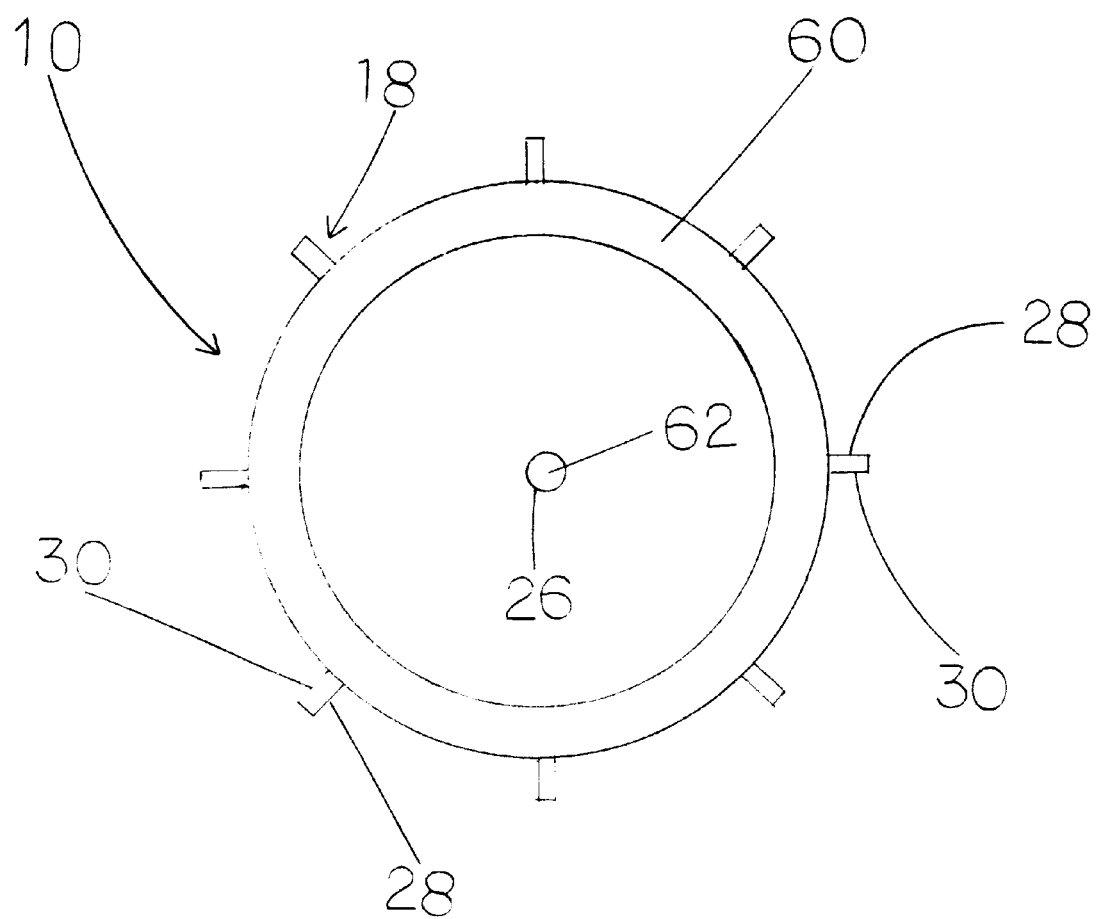
FIG. 20 is a bottom view of the embodiment of FIG. 19.

In another embodiment, the base 16 of the reflector 10 has the first auxiliary support member 58 and the second auxiliary support member 60; for providing additional support to the panel members 18, as shown in FIGS. 19 and 20. In this embodiment the first auxiliary support 58 is securely connected to the first surface 20 of the base 16 and to parts or portions of the adjacent or adjoining of the panels 18 adjacent or adjoining the support 58, if in such a structure. The second auxiliary support 60 is securely connected to the second surface 22 of base 16, and to adjacent or adjoining parts or portions of the panel members 18, opposite in position to the width portion 40, or to the fourth side portion 56 in its relevant embodiment.

It will be recognized that it is within the scope and spirit of the present invention, however, to provide various types, structures, and configuration of auxiliary or added support means to the panel members 18 mounted on the base 16, to support the panels 18 in the desired, described positional relationship.

In a further preferred embodiment the viewable image 34 of the second side 30 of each respective panel member 18 utilized as indicated in their respective adjacent positional relationship, is provided in sequenced or coordinated movement series so that each respective image 34 is at least somewhat positionally different, or illustrates a separate, distinct phase of the movement of an illustration, figure, or image; from that of an adjacent panel member 18, and its respective second side 30; as illustrated by example in FIGS. 3, 4, 9, 10, 11, and 12.

In additional preferred embodiments based on the concepts and teaching of equations (1) and (2), earlier discussed; "n" or the number of panel members 18 utilized and connected to the peripheral surface 24 of base 16; equals: 8 (as shown in FIGS. 9, 14, 18, 19, and 20); 10; 12 (as shown in FIGS. 1, 2, 3, 4, and 17); and 16.

Additionally, in preferred embodiments "x", or the width distance 46 of the respective panel members 18, is equal to between about 5 mm. to about 30 cm. (300 mm.) It will be understood, however, that "n" and "x" can equal other diverse values in the practice of the present invention, in other embodiments; and, as described later herein, a vast or very large number (theoretically unlimited in scope) can be utilized in a belted or tracted multi-panel embodiment within the concepts, scope and spirit of the present invention.

Additionally, in one preferred embodiment, the positional placement of the panel members was determined in accordance with the equation (3) as follows:

$$WD = \frac{rd}{n}, \tag{3}$$

where "WD" equals the width distance (46); "rd" equals the radial distance (50); and "n" equals the number of panel members 18 utilized, and connected to the base member 16.

The pivot means subassembly 14, in one embodiment of the invention has an axial rod member 62, as shown generally, from a bottom view, in FIG. 20. The rod 62 is a straight or axial, cylindrical rod of selected length, with two ends, for principally manual use. One of the ends of the rod 62 is attached, connected or mounted within the pivot channel 26 of base 16. In this manner: in the case where the rod 62 is securely fixed in the channel 26, when the rod 62 is moved rotationally or pivotably by the fingers, etc., or other like means, motion is provided or imparted to the base 16 and the attached panels 18; or, in the case where the panel members 18 themselves are used to provide motion to the base 16, the rod 62 acts as an axis upon which the base 16 can freely rotate.

In another embodiment, the pivot means 14 is provided with an axial pivot rod submember 64 and a sleeve submember 66 having at least two ends at either end of its length; and also having or defining the internal channel 68 which extends internally through at least a portion of the length of the sleeve 66, as shown in the example in FIG. 9; or which can also extend throughout the length of the sleeve 66, as shown by example in FIGS. 1 through 4. When the internal channel 68 extends through only a portion of the length of the sleeve 66, the axial pivot rod submember 64 is preferably inserted and installed within the channel 68 so that it extends outboard of at least one of the ends, thus having or creating/defining at least one outboard portion thereof, as is the case shown in FIG. 9. In the other embodiment illustrated by example in FIGS. 2, 3, and 4; where the channel 68 extends internally throughout the sleeve 66, the pivot rod 64 is preferably inserted and installed within channel 68 so that it extends outboard of, or a length, or distance, away from each of the two ends of the sleeve 66; thus creating at least two outboard portions. In each case at least one outboard portion of the pivot rod 64 is installed and inserted within, or otherwise attached, coupled, connected or pivotably mounted in the pivot channel 26 of the base 16 so that the base 16 can move, pivot, or revolve in relation to the pivot rod 64; i.e., such that the base 16 will move around or in relation to the rod 64; the rod 64 will by fixed connection impart movement to the channel 26 and base 16; or the base will otherwise move in relation to the rod 64 and channel 26.

Figure 21:
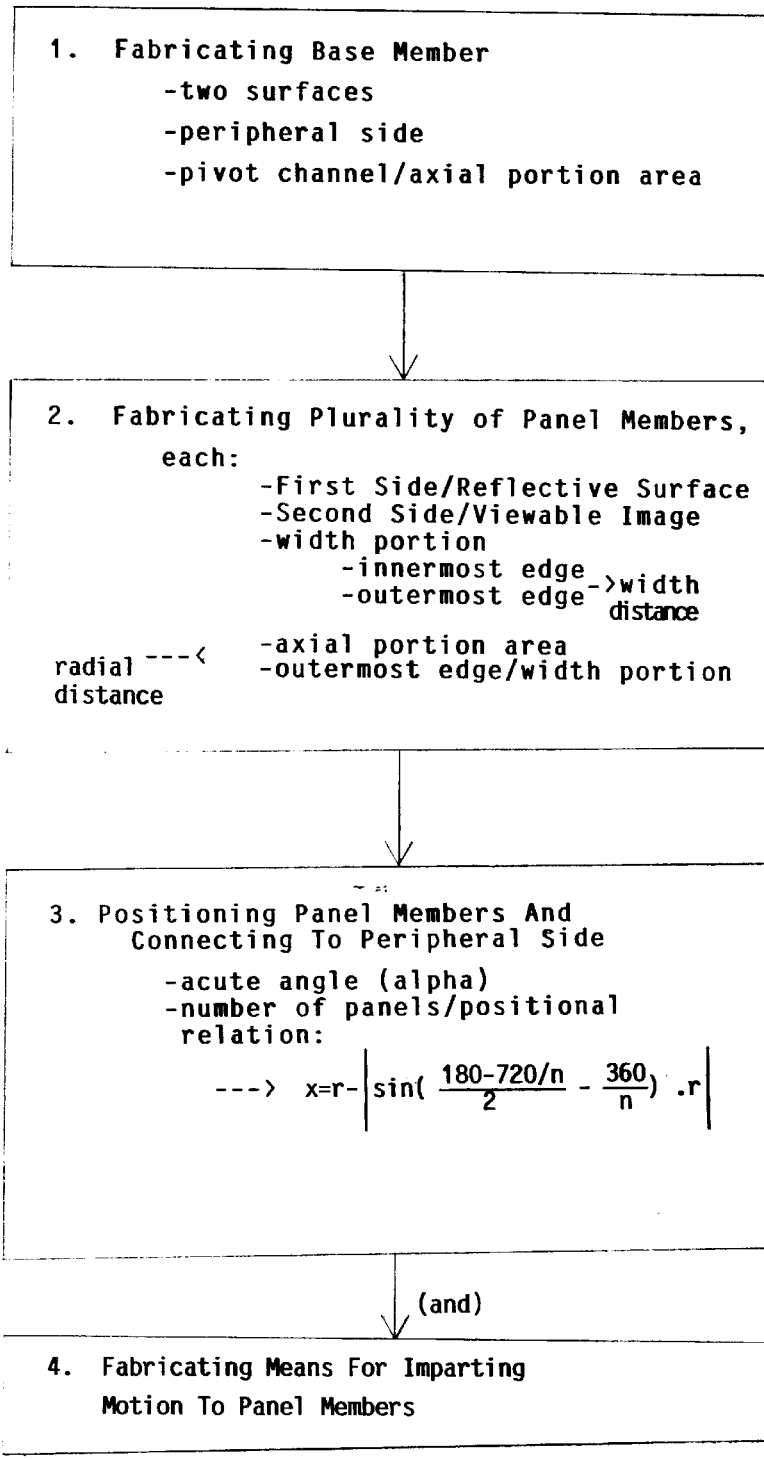
FIG. 21 is a schematic-block illustration and diagram of the process of the present invention.

In another inherently and specifically related embodiment of the invention, with those described herein; the process of making the reflector 10 entails and includes the following steps, illustrated schematically by example in FIG. 21, which can be accomplished in various ways or order of undertaking within the scope and spirit of the present invention: (1) fabricating or constructing the base member 16 having at least first and second surfaces 20 and 22, and having or defining the peripheral surface 24 and at least one pivot channel 26, formed and defined between the first and second surfaces 20 and 22, where the channel 26 creates or defines in at least one form or embodiment an axial portion area proximate thereto; (2) fabricating, making, or constructing a number or plurality of panel members 18, each having at least first and second sides 28 and 30, so that the first side 28 is constructed to have the reflective surface 32 and the second side 30 is constructed to have the viewable image 34, and the panels 18 are each further made to have the width portion 40 having first and second ends 42 and 44, which creates or defines the width distance 46 previously discussed; and where, as so constructed, the distance between the channel 26, or axial portion area, and the second end 44 of the width portion 40 creates, equals, or defines the radial distance 50 therebetween; and (3) positioning or installably placing each of the number of panel members 18 in relation to the pivot channel 26, or axial portion area, along the peripheral surface 24, so that the panels 18 are connected to surface 24 in adjacent respective relation to one another, and where the second side 30 of each respective given panel 18 and the first side 28 of each other respective adjacently adjoining panel 18 are in dihedral positional relationship to, and form the acute angle (alpha) 36 with or between each other. Additionally, the position of each of the number of panels 18 in relation to the pivot channel 26, or axial portion area, and the actual numerical amount or number of panels 18 utilized in this positional relationship is defined or found in accordance with the equation (2), discussed previously above of:

$$x = r - \left| \sin\left( \frac{180 - 720/n}{2} - \frac{360}{n} \right) \cdot r \right|,$$

where: "x" equals the width distance 46 of each of the respective number of panels 18; "r" equals the radial distance 50 of each respective number of panels 18; "n" equals the numerical amount of panels 18 used or utilized; and "t" equals the radial distance 50 minus (or subtracting) the width distance 46 as to each of the respective panels 18 so positioned; and (4) fabricating, constructing, or providing means for imparting motion to the base 16 and/or panels 18, and preferably interfacing this means with the pivot channel 26 of the base such that motion and revolution is brought about in relation thereto.

An additional embodiment of the present invention and reflector 10, previously discussed in part earlier, above, within the scope and spirit of the invention is a tracked or belted multi-panel embodiment assembly of the reflector 10 for creating images and motion-like illustrations. This preferred embodiment is illustrated generally, by example, in FIGS. 10, 11, and 12. The embodiment is provided with a panel support subassembly 70 which is provided with at least two wheel members, the first wheel 72 and the second wheel 74; and can be provided with two or more, or multi-wheel members, for providing motion and movement. Each of the wheels 72 and 74 is provided with the first side 76 and the second side 78, supporting or defining between the sides the circumferentially peripheral surface 80 and the pivot channel space 82. The positional panel support belt 84 is positioned tightly or biasably around each of the wheels 72 and 74, so that the movement of one or more wheels, regardless of the number of wheels used, causes, produces or imparts movement of the belt 84. a number or plurality of panel members 18 are utilized, each having the first side 28 and the second side 30, with first side 28 having the reflective surface 32 and the second side having the viewable image 34, each previously discussed earlier herein and utilized in this embodiment of the reflector 10.

In this embodiment each of the panels 18 are attached to and supported by the belt 84 in adjacent and adjoining positional relationship to each other, as previously discussed and illustrated, so that the acute angle (alpha) 36 is formed and defined between the adjacent pairing of the second side 30 of one given respective panel 18 of each of the panels 18, and the first side 28 of each other respective adjacent panel 18; with respect to all such pairings and adjacent positional relationships of second sides 30 to first sides 28, as to all the panels 18 utilized. Also, as discussed earlier, in preferred embodiments of the invention, the number of first sides 28 and second sides 30, and, therefore respective reflective surfaces 32 and viewable images 34, will be of an equal number, as utilized in the invention.

Figure 12:
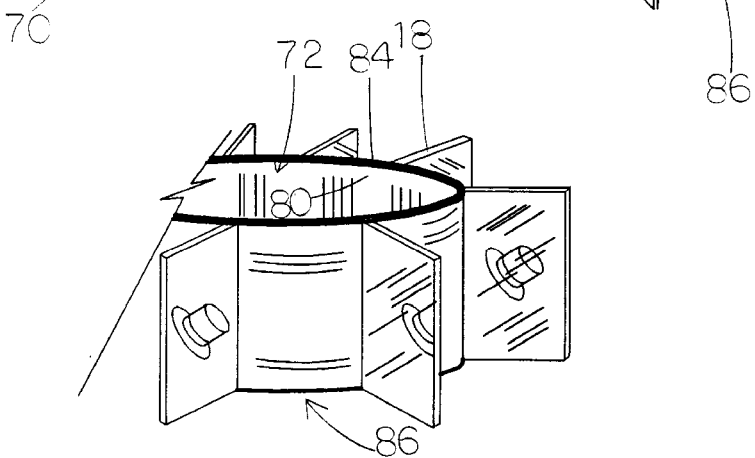
FIG. 12 is a partial perspective view of the panel units and reflective event areas of the reflector and Cinematograph of FIG. 10.
Figure 13:
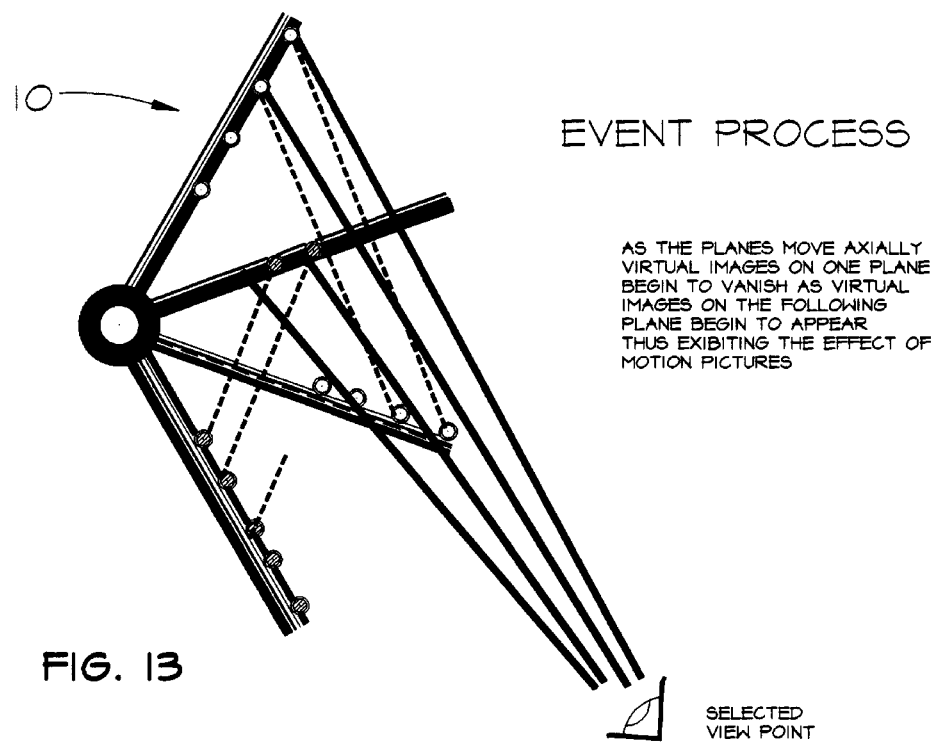
FIG. 13 is a schematic representation and illustration of the reflective event process of the reflector and Cinematograph of the present invention.
Figure 14:
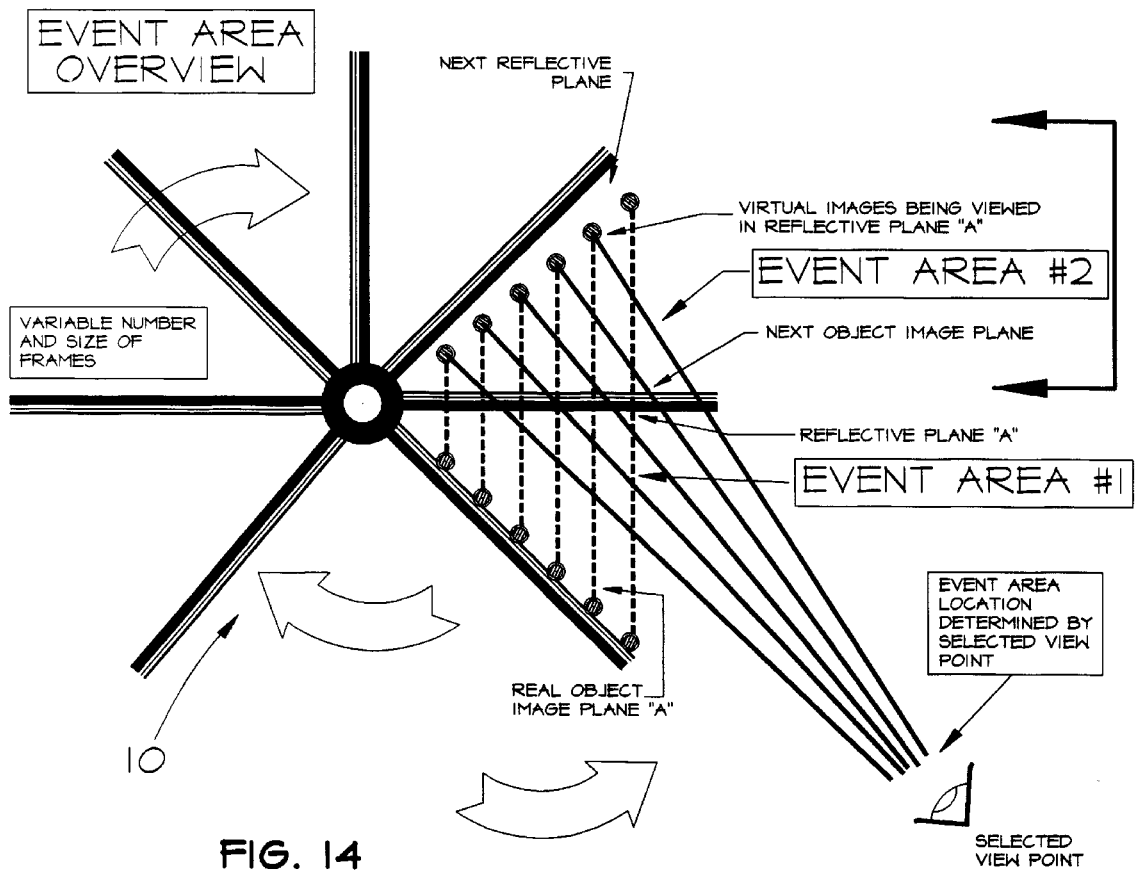
FIG. 14 is a schematic representation of an event area overview of the present invention.
Figure 15:
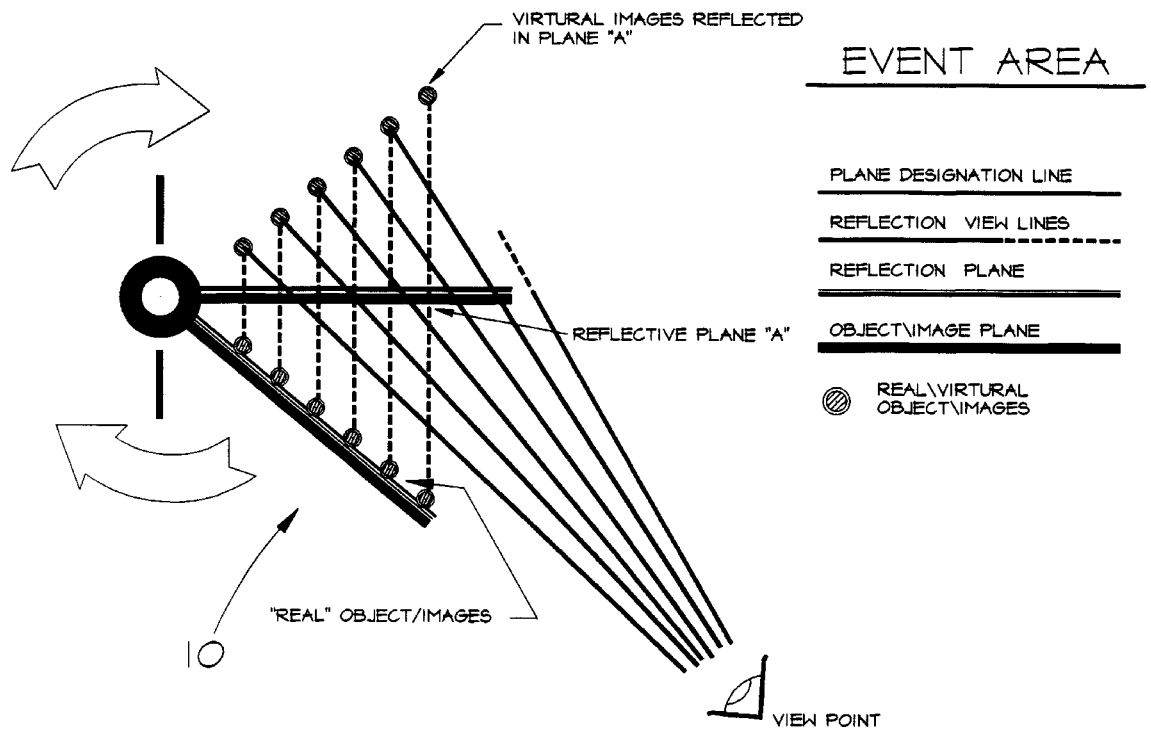
FIG. 15 is a further schematic illustration of the image event area regarding concepts of operation of the present invention.

In one related embodiment the acute angle (alpha) 36 is defined and formed at least during the time that the belt 84 passes, travels or moves over a portion of one of the wheels 72 or 74, as illustrated by example in FIG. 12; thus creating and defining at least one reflective event viewing area 86. this positioning, earlier discussed in part with regard to the other preferred embodiments discussed, is set out by general schematic example in FIGS. 13, 14, and 15.

The panel support subassembly 70 is further provided with power subassembly means 88 for providing motion to at least one of the wheels 72 and/or 74, for the purpose of providing motion and movement of the belt 84 and connected panels 18 (not specifically illustrated). this means 88 can take the form of manual or powered mechanism, as previously discussed, to provide motion to the pivot channel space 82, the adjacent belt 84, or another location of at least one of the wheels 72 and/or 74, to provide the desired motion or movement of the panels 18 at various selected speeds or time sequences affecting the event viewing area 86 and other positions, previously discussed where a perceptible image can be seen or perceived.

Additionally in related embodiments characterizing the panel support subassembly 70, and similar to other embodiments discussed, each of the panels 18 has the width portion 40 which has first and second ends 42 and 44. The distance or length between the first end 42 and the second end 44 of each respective panel 18 is the width distance 46. The radial distance 50, as also discussed in other embodiments, is measured or determined by the linear distance between the pivot channel space 82 and the second end 44 of each respective panel 18, at least along a spatial portion of one of the wheels 72 or 74, as shown by general example in FIG. 12. Also, the positional and proportional relationship between each of the wheels 72 and 74, or each respective wheel 72 and 74, or each respective wheel if more than two wheels are utilized, is such that at least along a given or selected (or proportionally determined) circumferential or peripheral space, portion or section, and the reflective event viewing area 86 determined or proximate thereto; the positional relationship, proportionality and number of panels 18 utilized is elucidated by the mathematical equation (2), previously discussed:

$$x = r - \left| \sin\left( \frac{180 - 720/n}{2} - \frac{360}{n} \right) \cdot r \right|,$$

where: x equals the width distance 46 of the respective panels 18; r equals the radial distance 50 of the respective panels 18; n equals the numerical amount of panels 18 utilized and attached as discussed; and t equals the radial distance 50 minus (or subtracting) the width distance 46 as to each respective panel 18; and where x also equals r minus t, r also equals x plus (+) t; and t also equals r minus (−) x. In these embodiments the respective radial distance 50 of each respective panel 18 minus (−) the associated respective width distance 46 equals, indicates or defines a respective operational linear placement distance, or installation location, defined from the pivot channel space 82 of the first wheel 72 to the first end 42 of the respective width portion 40 of each of the panels 18 passing adjacent to the reflective event viewing area 86, and the selected circumferential space or section discussed just above.

Additionally, with regard to the panel support subassembly 70 and other preferred embodiments thereof, or related within the spirit of the invention thereto, one or more reflective event viewing areas 86 can be defined, utilizing the concepts of the present invention, and provided at one or more accessible locations of the subassembly 70 so that an observer or user can utilize a plurality, or unspecified or diverse plurality of panels 18 and inter-relating adjacent second and first sides 30 and 28 of each adjacent pair of panels 18, as previously discussed, to visualize or perceive an image or reflective event 86. Also, the belt 84 can be constructed of many diverse types of resilient material and be extended in length over a divergent wide range from short distances to extended long distances, using multi-panels 18 to provide figures, illustrations or motion-like images. Additionally within the teaching of the present invention is the utilization at one portion of one of the wheels 72 and/or 74 of a means for stacking, loading and mounting panel members 18 onto the belt 84 for motion and movement of each respective mounted panel to a selected image event, or viewing area or areas, or reflective event viewing area 86 as earlier discussed. Such a means would, in one embodiment thereof, have a system using a pick-up and release mechanism, interfaced with a panel 18 supply area, to interchangeably pickup and replace different respective panels 18 stably and positionally in accordance with the angle (alpha) 36 and/or positional equations (1), (2) and/or (3) previously discussed, onto and off of the belt 84.

It is a teaching of the present invention that a reflective event unit providing a potential viewable image area, or reflective event 86, is defined by the respective adjacent panel members between the viewable image 34 of the second side 30 of any one given, respective, panel 18 and the reflective surface 32 of the first side 28 of another adjacent panel member 18; as illustrated schematically by example in FIGS. 13, 14, and 15. As illustrated therein regarding the perceivable image event process of the reflector 10, and it optical process and apparatus, a plurality or number of reflective surfaces, by virtue of the reflective event units, enter an image event area, and the respective first and second sides 28 and 30 (and therefore 32 and 34) form at the acute angles 36 and axially in relation to one another as they pass into and through the event area on a progressive course. Each reflective surface 32 reflects the adjacent viewable image 34 (or object area) between between it and the next panel 18. As such, theoretically, as illustrated, the back side of each reflective surface 32 defines the object plane and the outer edge of the plane defines the leading or trailing edge, depending on the direction of movement of the panels 18 and respective adjacent first and second sides 28 and 30. In the present invention, the leading or trailing edge appears to open each picture or image or object frame while causing the last frame to disappear. As these continue their course through the event area, as illustrated, the images reflected in the process appear to be in motion.

Figure 22:
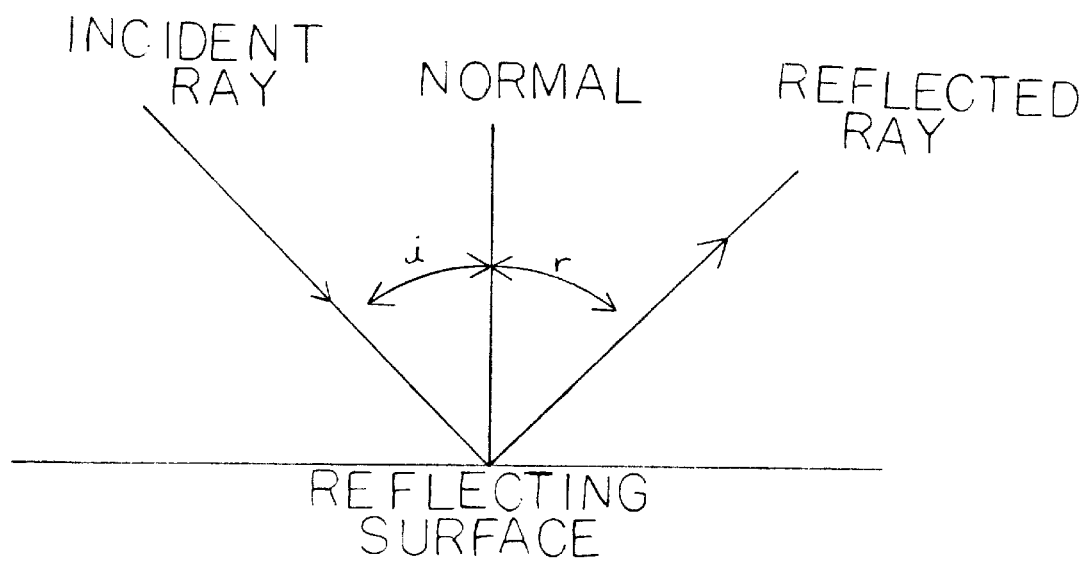
FIG. 22 is a schematic drawing to illustrate the relationship of light in the reflection of an image from a standard mirror.
Figure 23:
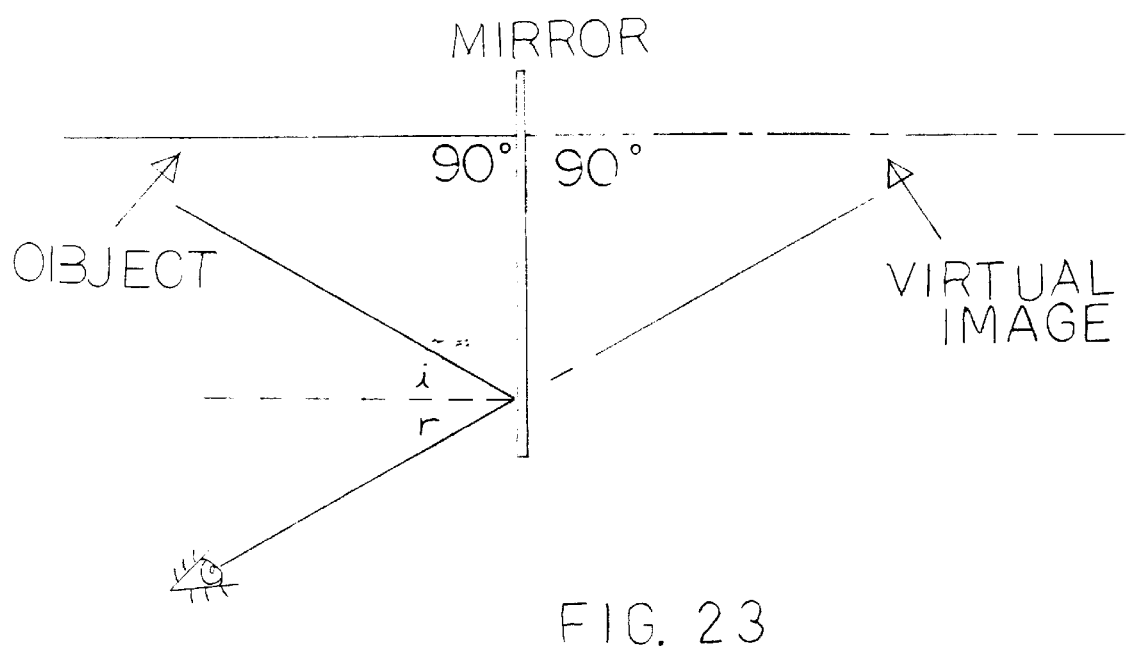
FIG. 23 is another schematic drawing to show, by example, the reflection of an image from a standard mirror and the positional relationship of light rays.

Additionally, in reviewing the schematic illustrations of FIGS. 13, 14, and 15; it will be appreciated in considering the advantages over the prior art of the present invention, that the basic or essential law of reflection applies and is inherent in the present invention, though the present invention was never discovered before. In this regard, specifically, it will be understood that in basic terms the angle of incidence of each light ray is essentially equal to its angle of reflection. The angle of incidence is measured by schematically or representationally drawing a ray of light from the subject object, figure, or viewable image to the mirror. A line is constructed at right angles to the surface of its point of contact with the light ray. The angle of incidence is the angle between this perpendicular (or transverse relationship—called the "normal") and the light ray. the angle of reflection is, therefore, the angle between the "normal" and the reflected ray, as set forth schematically in FIGS. 22 and 23.

A given mirror or standard reflective surface, therefore, acts as if it were a clear window with the object placed as far back as it actually is in front of it, as it is seen or viewed.

The reflector 10 can be constructed of a diverse number of materials including, but not limited to, light metal alloy, laminate and polymer constructive materials. As earlier discussed the panel members 18 should preferably be constructed from stiffly resilient material so that each panel 18 and its retained first and second sides 28 and 30, and borne reflective surface and viewable images 32 and 34; respectively; will not be subject to any substantial bending or very much elasticity. Each member or element of the invention can be connected, attached, coupled or otherwise mounted together individually utilizing connective means such as polymer, glue, cement, weld or other attachment means; or one or more of such elements can be integrally formed and constructed.

Additionally, various types of viewable images 34 can be provided, including designs, illustrations, figures, objects or images, including those of 2-D or 3-D quality, or those with different dimensions or various raised or differential dimensions; which are presented in sequence or series in the respective adjacent panel members 18 and their respective adjacent second sides 30, as positioned, so as to show a stationary or motion-like image presentation. However, it will be understood that the reflector 10 of the present invention is well suited, and provides significant advantages over the prior art, structurally and functionally, through its device, apparatus, assembly, and associated process of construction, in thereby providing vastly more accessible motion-like objects, figures, illustrations and other moving-image presentations.

With respect the use of viewable images 34, where one or more of such images take the form of hologram-like images or certain 3-D types of images; such images could utilize or be a part of what would otherwise be considered blurred areas or extremities of a reflective event unit 38 (or adjacent respective reflective surface 32 or viewable image 34 of corresponding first and second sides 28 and 30). Under such conditions, where portions of the reflected image might appear on perimeter or frame-area locations; the positional, proportional and/or numerical relationships elucidated by equations (1), (2), and (3) would be expected to be accordingly affected, and, in at least certain cases, changed or different in result.

Accordingly, the appended claims are intended to cover all changes, modifications and alternative options and embodiments falling within the true breath, scope and spirit of the present invention. the reader is, therefore, requested to determine the scope of the invention by the appended claims and their legal equivalents, and not by the examples which have been given.

What is claimed is:

1. A cinematographic reflector assembly for creating images and motion-like illustrations, said cinematographic reflector assembly comprising:

a panel support subassembly, said panel support subassembly having:

at least one base member, said base member having first and second surfaces, and defining a peripheral surface and at least one pivot channel therebetween, and a number of panel members, each of said panel members having at least a stiffly resilient first side and second side, the first side and the second side being positioned substantially opposite to one another, said first side having a reflective surface and said second side having a viewable image thereon, said panel members being connected to the peripheral surface of said base member in adjacent respective relation to one another, such that the second side of each of the respective said panel members and the first side of each of the adjacent respective said panel members defines and forms an acute angle, alpha, therebetween; and a pivot means subassembly for providing and imparting motion to the panel support subassembly, said pivot means subassembly being connected to the at least one pivot channel of said base member for imparting motion and pivotable movement thereto;

whereby, upon motion of said base member, an image is defined and provided along a viewing event area which is perceptibly accessible by a plurality of sight lines of a viewer.

2. A tiltable, angularly placed, and multi-positionable, cinematographic reflector device for presenting images and motion-like illustrations in perceptible viewing-event areas when the device is placed in a number of positions in relation to a sight-line of a user of the device, said cinematographic reflector comprising:

a panel support, said panel support having:

a framework member having first and second surfaces, and defining a peripheral surface and a pivot space therebetween, a plurality of respective panel member-units, each of said respective panel member-units having at least a first side and a second side, positionally, diametrically opposite to one another, the first side having and bearing a reflective surface and the second side having and bearing a viewable image, said respective panel member-units being fixedly connected to, and supported by, or retained to, the peripheral surface of said framework member in adjacent respective positional relation to one another, such that the second side of each of the respective panel member-units is substantially at an acute angle alpha, in substantial dihedral relation, to the first side of the other adjacent respective panel member-unit, thereby defining between adjacently borne respective reflective surface and viewable image, a reflective and viewable image, thereby defining a reflective event unit therebetween; and pivot means for providing motion to the panel support, said pivot means being connected to the pivot space of said framework member for providing motion thereto;

whereby, upon motion of said framework member, an image is defined and provided along a diverse number of said reflective event units which are perceivable and accessible along a number of sight angles by a viewer or user of the device, and by virtue of a number of tiltable and positional placements and locations of the reflector device in reference to an observer.

3. The cinematographic reflector device of claim 2, wherein:

each of said respective panel members further comprises a respective width portion having first and second ends, the first and second ends defining a respective width distance therebetween, the pivot space defines an axial point, and the axial point and the second end of each respective said width portion defines a respective radial distance therebetween; and wherein:

the positional relationship and number of each of said respective panel members is defined by the equation:

$$(r-t) = (x+t) - \left|\sin\left(\frac{180 - 720/n}{2} - \frac{360}{n}\right) \times (x+t)\right|,$$

where, x equals the respective width distance of each of the respective said panel members, r equals the respective radial distance, n equals a numerical amount of the number of the respective panel members connected to the peripheral surface of said framework member, and t equals the respective radial distance minus the respective width distance; and wherein the respective radial distance minus the respective width distance defines a respective operational placement distance, from the axial point to the first end of the respective width portion of the respective panel members.

4. The cinematographic reflector device of claim 3, wherein:

if n is equal to or less than 8, the equation equals a yield number which is equal to or less than 0, or a negative number, thereby, defining that the first end of the respective width portion positionally adjoins, and begins at, a placement point substantially proximate to, and adjoining, the axial point, and that the yield number of the equation is equal to or less than the respective radial distance.

5. The cinematographic reflector device of claim 2, wherein:

each of said respective panel members further comprises a width portion having an innermost edge and a outermost edge, defining therebetween a width distance, and wherein the pivot space defines an axial portion area, and the axial portion area and the outermost edge substantially define a radial distance therebetween; and wherein, the positional relationship and number of the respective panel members is defined by the equation:

$$x = r - \left|\sin\left(\frac{180 - 720/n}{2} - \frac{360}{n}\right) \cdot r\right|,$$

where, x equals the width distance, r equals the radial distance, n equals a numerical amount of the number of the respective panel members connected to the peripheral surface of said framework member, where n equals at least 2, t equals the radial distance minus the width distance, and where, x equals r minus t, r equals x plus t, and t equals r minus x, and also equals:

$$\left|\sin\left(\frac{180 - 720/n}{2} - \frac{360}{n}\right) \cdot r\right|;$$

and wherein the radial distance minus the width distance substantially defines and yields a operational placement distance, from the axial portion area to the innermost edge of the width portion of the respective panel members;

and wherein:

if n is equal to or greater than 2, or equal to or less than 8, the equation equals, or x is equal to, a yield number which is equal to or less than 0, or a negative number, thereby, defining that the innermost edge of the respective width portion positionally adjoins, and substantially begins at, a placement point substantially adjoining the axial portion area, and that the yield number of the equation is equal to or less than the radial distance.

6. The cinematographic reflector device of claim 4, wherein:

the framework member is circular in configuration when viewed from the first and second surfaces, the peripheral surface is circumferentially oriented between said first and second surfaces, and the pivot space is positioned substantially in center axial and concentrical relation to the first and second surfaces of said framework member.

7. The cinematographic reflector device of claim 6, wherein:

the respective panel members are circular in configuration when viewed from the first and second sides thereof, each having a diameter-like dimension, which, herein, comprises said respective width portion.

8. The cinematographic reflector device of claim 5, wherein:

the respective panel members are rectangular-like in configuration when viewed from the first and second sides thereof, each of said respective panel members further having first and second length portions, oriented linearly, and substantially opposing and parallel to one another; a third side portion, substantially, transversely positioned between said first and second length portions; and a fourth side portion, being generally cantilevered in configurational orientation, connecting between said first and second length portions.

9. The cinematographic reflector device of claim 6, wherein:

the framework member further comprises an auxiliary support member means for providing additional support to the respective panel members in their interface with the peripheral surface of said framework member, said auxiliary support member being fixedly connected to the first surface of the framework member, and further being attached to each of the respective panel members along an adjoining part thereof.

10. The cinematographic reflector of claim 6, wherein:

the framework member comprises at least first and second auxiliary support members for providing additional support to the respective panel members, said first auxiliary support member being fixedly connected to the first surface of the framework member, and further being attached to the respective panel members along an adjacent part thereof, and said second auxiliary support member being fixedly connected to the second surface of said framework member, and further being attached to the respective panel members along an adjacent part thereof.

11. The cinematographic reflector of claim 4, wherein:

the viewable image of the second side of each of said respective panel members, in their said adjacent respective relation, is sequenced and coordinated such that each respective said viewable image is positionally different from that of the adjacent panel member.

12. The cinematographic reflector of claim 5, wherein:

n is equal to 8;

and wherein, x equals between about 5 mm. to about 30 cm. or 300 mm.

13. The cinematographic reflector of claim 5, wherein:
n is equal to 10.

14. The cinematographic reflector of claim 5, wherein:
n is equal to 12.

15. The cinematographic reflector of claim 5, wherein:
n is equal to 16.

16. The cinematographic reflector device of claim 2, wherein:
each of said respective panel members further comprises a width portion having an innermost edge and a outermost edge, defining therebetween a width distance, and wherein the pivot space defines an axial portion area, and the axial portion area and the outermost edge substantially define a radial distance therebetween; and wherein, the positional relationship, proportionality and number of the respective panel members is elucidated by the mathematical expression:

$$WD = \frac{rd}{n},$$

where,
WD equals the width distance,
rd equals the radial distance, and
n equals the number of the respective panel members.

17. The cinematographic reflector device of claim 2, wherein:
the pivot means further comprises an axial rod member having first and second ends, the first end thereof being mounted within the pivot space of said framework member, such that the framework member can pivot and revolve in relation thereto.

18. The cinematographic reflector device of claim 2, wherein:
the pivot means further comprises an axial pivot subassembly, said axial pivot subassembly having an axial rod member and a sleeve member having first and second ends at opposite ends of its length, said sleeve member defining an internal channel extending throughout at least a portion of its length, the axial rod member being inserted within the internal channel such that it extends outboard of at least the first end of said sleeve member, and defines thereby at least a first outboard portion of said axial rod member when so inserted in said sleeve member, said first outboard portion being pivotably mounted within said pivot space of said framework member such that the framework member can pivot and revolve in relation thereto.

19. A process for making a cinematographic reflector, said process comprising the following steps:
fabricating a base member having at least first and second surfaces, and defining a peripheral side and at least one pivot channel therebetween, the pivot channel defining an axial portion area;
fabricating a number of panel members, each having at least first and second sides, wherein the first side is fabricated to have a reflective surface and the second side is fabricated to have a viewable image, said number of panel members each being further fabricated to have a width portion having an innermost edge and a outermost edge, defining therebetween a width distance, and wherein the axial portion area and the outermost edge of the width portion define a radial distance therebetween; and positioning each of said number of panel members in relation to the axial portion area, and connecting said number of panel members to the peripheral side of said base member, such that the number of panel members are connected to the peripheral surface in adjacent respective relation to one another, the second side of each of the respective said number of panel members and the first side of each of the adjacent respective said number of panel members are in dihedral positional relation to, and form an acute angle between, one another, and the position of each of said number of panel members is positioned in relation to the axial portion area, and the actual number of said panel members utilized in this relationship is defined in accordance with the equation:

$$x = r - \left| \sin\left(\frac{180 - 720/n}{2} - \frac{360}{n}\right) \cdot r \right|,$$

where,
x equals the width distance of each of said number of panel members,
r equals the radial distance of each of said number of panel members,
n equals a numerical amount of the number of panel members, and
t equals the radial distance minus the width distance as to each of said number of panel members; and
fabricating means for imparting motion to said panel members, and interfacing said means in relation with the axial portion area of the at least one pivot channel of said base member.

20. A cinematographic reflector assembly for creating images and motion-like illustrations, said assembly comprising:
a panel support subassembly, having:
at least first and second wheel members, each having first and second sides, and defining therebetween a circumferentially peripheral surface and pivot channel space,
a positional panel support belt member, being positionally and biasably connected to, by virtue of encirclement around, each of said wheel members, such that movement of at least one of said wheel members causes movement of said positional panel support belt member,
a plurality of panel members, each having a first side and a second side, the first side having a reflecting surface and the second side having a viewable image,
each of said panel members being supportably attached to the positional panel support belt member in adjacent positional relation to one another, such that an acute angle alpha is defined and formed between the second side of one given respective said panel member and the first side of each other respective adjacent panel member, as to each of said panel members, the acute angle alpha being defined and formed at least as the positional panel support belt member and connected panels passes over a portion of the first wheel member, said portion of the first wheel member defining a reflective event viewing area; and
subassembly means for providing and imparting motion to at least on of said wheel members.

21. The cinematographic reflector assembly of claim 20, wherein:
each of said panel members further comprises a width portion having first and second ends, each respective first and second ends defining a width distance therebetween, and wherein the pivot channel space and the second end of each respective said width portion defines a radial distance, at least, substantially, at said portion of said first wheel member, and wherein the positional and proportional relationship between each of said wheel members is such that, at least along said portion of the first wheel member and the reflective event viewing area, the positional relationship, proportionality and number of the panel members is elucidated by the mathematical equation:

$$x = r - \left|\sin\left(\frac{180 - 720/n}{2} - \frac{360}{n}\right) \cdot r\right|,$$

where, x equals the respective width distance, r equals the respective radial distance, n equals the numerical amount of said panel members, t equals the respective radial distance minus the respective width distance, and where, x equals r minus t, r equals x plus t, and t equals r minus x, the respective radial distance minus the respective width distance defining a respective operational linear placement distance, from the pivot channel space of the first wheel member to the first end of the respective width portion of each of said panel members passing adjacent to the reflective event viewing area.

* * * * *